US012707511B2

(12) United States Patent
Liu et al.

(10) Patent No.: US 12,707,511 B2
(45) Date of Patent: Aug. 11, 2026

(54) QUALITY OF EXPERIENCE RELEASE WHEN A USER EQUIPMENT MOVES OUT OF AREA SCOPE

(71) Applicant: QUALCOMM Incorporated, San Diego, CA (US)

(72) Inventors: Jianhua Liu, Beijing (CN); Shankar Krishnan, San Diego, CA (US); Xipeng Zhu, San Diego, CA (US); Rajeev Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/567,457

(22) PCT Filed: Aug. 10, 2022

(86) PCT No.: PCT/CN2022/111332

§ 371 (c)(1),
(2) Date: Dec. 6, 2023

(87) PCT Pub. No.: WO2023/020342

PCT Pub. Date: Feb. 23, 2023

(65) Prior Publication Data

US 2024/0224347 A1 Jul. 4, 2024

(30) Foreign Application Priority Data

Aug. 16, 2021 (WO) ................ PCT/CN2021/112704

(51) Int. Cl.
*H04W 76/10* (2018.01)
*H04W 76/30* (2018.01)
*H04W 80/10* (2009.01)

(52) U.S. Cl.
CPC .......... *H04W 76/10* (2018.02); *H04W 76/30* (2018.02); *H04W 80/10* (2013.01)

(58) Field of Classification Search
None
See application file for complete search history.

(56) References Cited

U.S. PATENT DOCUMENTS 10,341,895 B2 7/2019 Zhu et al.
2020/0280498 A1 9/2020 Eklöf et al.
(Continued)

FOREIGN PATENT DOCUMENTS

CN 107534887 A 1/2018
CN 109155764 A 1/2019
(Continued)

OTHER PUBLICATIONS

ERICSSON: “Discussion on Incoming LSes for QoE Measurement Collection in Lte”, 3GPP TSG RAN WG2 #110-e, R2-2004623, pp. 1-6, Electronic Meeting, Jun. 1-12, 2020, Section 2.
(Continued)

*Primary Examiner* — Angela Nguyen
(74) *Attorney, Agent, or Firm* — Harrity & Harrity, LLP

(57) ABSTRACT

Various aspects of the present disclosure generally relate to wireless communication. In some aspects, a user equipment (UE) may initiate a quality of experience (QoE) session for a QE configuration at an application layer of the UE. The UE may provide, from the application to a radio resource control (RRC) layer of the UE, a session start or stop indication based at least in part on initiating the QoE session. The indication may include at least one of a service type, an RRC level identifier, a QoE reference, or a QoE measurement collection. The UE may provide, to a base station and based at least in part on the indication, information indicating the service type, the RRC level identifier, the QoE reference, or the QoE measurement collection. Numerous other aspects are described.

18 Claims, 14 Drawing Sheets

(56) References Cited

U.S. PATENT DOCUMENTS

| | | | | |
|---|---|---|---|---|
| 2021/0120621 | A1 | 4/2021 | Kwong et al. | |
| 2023/0388829 | A1* | 11/2023 | Eklöf | H04L 41/5067 |
| 2023/0388830 | A1* | 11/2023 | Eklöf | H04W 36/0085 |
| 2024/0314662 | A1* | 9/2024 | Krishnan | H04W 36/304 |

FOREIGN PATENT DOCUMENTS

| | | | |
|---|---|---|---|
| CN | 110301151 | A | 10/2019 |
| WO | 2008034128 | A1 | 3/2008 |
| WO | 2022084926 | A1 | 4/2022 |

OTHER PUBLICATIONS

ERICSSON: "Mobility Support for NR QoE Management", 3GPP TSG-RAN WG2 Meeting #115-e, R2-2108110, Electronical Meeting, Aug. 9-27, 2021, pp. 1-5, Sections 2-3.

HUAWEI., et al., "Discussion on QoE Measurement Configuration and Reporting", 3GPP TSG RAN Meeting #113-e, R2-2101189, Feb. 5, 2021, 9 Pages, Section 2.5.

International Search Report and Written Opinion—PCT/CN2021/112704—ISA/EPO—Apr. 28, 2022.

International Search Report and Written Opinion—PCT/CN2022/111332—ISA/EPO—Nov. 9, 2022.

CHINA UNICOM, et al., "Running CR for Introduction of QoE Measurements in NR", 3GPP TSG-RAN2 Meeting #114-e, R2-2106684, 3rd Generation Partnership Project, Mobile Competence Centre, 650, Route Des Lucioles, F-06921 Sophia-Antipolis Cedex, France, vol. RAN WG2, No. Electronic Meeting, May 19, 2021-May 27, 2021, Jun. 7, 2021, 12 Pages, XP052026068, Section AI. Configuration architecture general aspects.

Huawei, et al., "Discussions on Potential RAN3 Impacts about the QoE Measurement Configuration, Reporting and Releasing Under SA, NSA and MR-DC Operation", 3GPP TSG-RAN WG3 Meeting #110-e, R3-206734, 3rd Generation Partnership Project, Mobile Competence Centre, 650, Route Des Lucioles, F-06921 Sophia-Antipolis Cedex, France, vol. RAN WG3, No. Nov. 2, 2020-Nov. 12, 2020, Oct. 23, 2020, 7 Pages, XP051946081, Fig. 1 and explicatrory text.

Supplementary European Search Report—EP22857654—Search Authority—Munich—Jun. 12, 2025.

Zte, et al., "Discussion on NR QoE Configuration", 3GPP TSG-RAN WG3 #112-e, R3-212435, 3rd Generation Partnership Project, Mobile Competence Centre, 650, Route Des Lucioles, F-06921 Sophia-Antipolis Cedex, France, vol. RAN WG3, No. Online, May 17, 2021-May 28, 2021, May 7, 2021, XP052002479, 5 Pages, Section 2.1. Support for multiple QoE configuration.

* cited by examiner

400

800

QUALITY OF EXPERIENCE RELEASE WHEN A USER EQUIPMENT MOVES OUT OF AREA SCOPE

CROSS-REFERENCE TO RELATED APPLICATIONS

This Patent Application is a 371 National Stage of Patent Cooperation Treaty (PCT) Patent Application No. PCT/CN2022/111332, filed on Aug. 10, 2022, entitled "QUALITY OF EXPERIENCE RELEASE WHEN A USER EQUIPMENT MOVES OUT OF AREA SCOPE," and claims priority to PCT Patent Application No. PCT/CN2021/112704, filed on Aug. 16, 2021, entitled "QUALITY OF EXPERIENCE RELEASE WHEN A USER EQUIPMENT MOVES OUT OF AREA SCOPE," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for quality of experience (QoE) release when a user equipment (UE) moves out of area scope.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include initiating a quality of experience (QoE) session for a QoE configuration, the QoE session being initiated at an application layer of the UE. The method may include providing a session start or stop indication based at least in part on initiating the QoE session, the session start or stop indication being provided from the application layer to an RRC layer of the UE, where the session start or stop indication includes at least one of a service type associated with the QoE configuration, an RRC level identifier associated with the QoE configuration, a QoE reference associated with the QoE configuration, or a QoE measurement collection (QMC) associated with the QoE configuration. The method may include providing, to a base station and based at least in part on the session start or stop indication, information indicating at least one of the service type associated with the QoE configuration, the radio resource control (RRC) level identifier associated with the QoE configuration, the QoE reference associated with the QoE configuration, the QMC associated with the QoE configuration.

Some aspects described herein relate to a method of wireless communication performed by a first base station. The method may include receiving, from a UE, information indicating at least one of a service type associated with a QoE configuration, an RRC level identifier associated with the QoE configuration, a QoE reference associated with the QoE configuration, or a QMC associated with the QoE configuration, where the information indicating the at least one of the service type, the RRC level identifier, the QoE reference, or the QMC indicates there is an ongoing QoE session for the QoE configuration at the UE. The method may include storing an indication of the QoE configuration based at least in part on receiving the information indicating the at least one of the service type, the RRC level identifier, the QoE reference, or the QMC. The method may include providing the indication of the QoE configuration to a second base station during a triggering event associated with the UE.

Some aspects described herein relate to a method of wireless communication performed by a QoE server. The method may include receiving a session start or stop indication at a UE, where the session start or stop indication includes at least one of a service type associated with the ongoing QoE session or a QoE reference associated with the ongoing QoE session. The method may include identifying a QoE configuration associated with the ongoing QoE session based at least in part on the at least one of the service type or the QoE reference. The method may include providing information indicating the QoE configuration associated with the ongoing QoE session to a base station.

Some aspects described herein relate to a method of wireless communication performed by a UE. The method may include initiating a QoE session for a QoE configuration, the QoE session being initiated at an application layer of the UE. The method may include providing a session start or stop indication at the UE, the session start or stop indication being provided from the application layer to a QoE server, where the session start or stop indication includes at least one of a service type associated with the ongoing QoE session, a QoE reference associated with the ongoing QoE session, or a session identifier associated with the ongoing QoE session.

Some aspects described herein relate to a method of wireless communication performed by a first base station. The method may include receiving, from a QoE server, information indicating a QoE configuration associated with an ongoing QoE session at a UE. The method may include storing an indication of the QoE configuration based at least in part on receiving the information indicating the QoE configuration. The method may include providing the indication of the QoE configuration to a second base station during a triggering event associated with the UE.

Some aspects described herein relate to a method of wireless communication performed by a QoE server. The method may include determining whether a UE is located in an area associated with a QoE configuration configured on the UE. The method may include selectively releasing the QoE configuration based at least in part on the determination of whether the UE is located in the area associated with the QoE configuration.

Some aspects described herein relate to a method of wireless communication performed by a base station. The method may include providing, to a QoE server, at least one of, information indicating whether a UE is located in an area associated with a QoE configuration configured for the UE, or information associated with a target cell of the UE. The method may include receiving a command associated with releasing the QoE configuration configured on the UE.

Some aspects described herein relate to a UE for wireless communication. The user equipment may include a memory and one or more processors coupled to the memory. The one or more processors may be configured to initiate a QoE session for a QoE configuration, the QoE session being initiated at an application layer of the UE. The one or more processors may be configured to provide a session start or stop indication based at least in part on initiating the QoE session, the session start or stop indication being provided from the application layer to an RRC layer of the UE. The one or more processors may be configured to provide, to a base station and based at least in part on the session start or stop indication, information indicating at least one of the service type associated with the QoE configuration, the RRC level identifier associated with the QoE configuration, the QoE reference associated with the QoE configuration, or the QMC associated with the QoE configuration.

Some aspects described herein relate to a first base station for wireless communication. The first base station may include a memory and one or more processors coupled to the memory. The one or more processors may be configured to receive, from a UE, information indicating at least one of a service type associated with a QoE configuration, an RRC level identifier associated with the QoE configuration, a QoE reference associated with the QoE configuration, or a QMC associated with the QoE configuration. The one or more processors may be configured to store an indication of the QoE configuration based at least in part on receiving the information indicating the at least one of the service type, the RRC level identifier, the QoE reference, or the QMC. The one or more processors may be configured to provide the indication of the QoE configuration to a second base station during a triggering event associated with the UE.

Some aspects described herein relate to a QoE server for wireless communication. The QoE server may include a memory and one or more processors coupled to the memory. The one or more processors may be configured to receive a session start or stop indication at a UE. The one or more processors may be configured to identify a QoE configuration associated with the ongoing QoE session based at least in part on the at least one of the service type or the QoE reference. The one or more processors may be configured to provide information indicating the QoE configuration associated with the ongoing QoE session to a base station.

Some aspects described herein relate to a UE for wireless communication. The UE may include a memory and one or more processors coupled to the memory. The one or more processors may be configured to initiate a QoE session for a QoE configuration, the QoE session being initiated at an application layer of the UE. The one or more processors may be configured to provide a session start or stop indication at the UE, the session start or stop indication being provided from the application layer to a QoE server.

Some aspects described herein relate to a first base station for wireless communication. The first base station may include a memory and one or more processors coupled to the memory. The one or more processors may be configured to receive, from a QoE server, information indicating a QoE configuration associated with an ongoing QoE session at a UE. The one or more processors may be configured to store an indication of the QoE configuration based at least in part on receiving the information indicating the QoE configuration. The one or more processors may be configured to provide the indication of the QoE configuration to a second base station during a triggering event associated with the UE.

Some aspects described herein relate to a QoE for wireless communication. The quality of experience may include a memory and one or more processors coupled to the memory. The one or more processors may be configured to determine whether a UE is located in an area associated with a QoE configuration configured on the UE. The one or more processors may be configured to selectively release the QoE configuration based at least in part on the determination of whether the UE is located in the area associated with the QoE configuration.

Some aspects described herein relate to a base station for wireless communication. The base station may include a memory and one or more processors coupled to the memory. The one or more processors may be configured to provide, to a QoE server, at least one of. The one or more processors may be configured to receive a command associated with releasing the QoE configuration configured on the UE.

Some aspects described herein relate to a non-transitory computer-readable medium that stores a set of instructions for wireless communication by a UE. The set of instructions, when executed by one or more processors of the UE, may cause the UE to initiate a QoE session for a QoE configuration, the QoE session being initiated at an application layer of the UE. The set of instructions, when executed by one or more processors of the UE, may cause the UE to provide a session start or stop indication based at least in part on initiating the QoE session, the session start or stop indication being provided from the application layer to an RRC layer of the UE. The set of instructions, when executed by one or more processors of the UE, may cause the UE to provide, to a base station and based at least in part on the session start or stop indication, information indicating at least one of the service type associated with the QE configuration, the RRC level identifier associated with the QoE configuration, the QoE reference associated with the QoE configuration, or the QMC associated with the QoE configuration.

Some aspects described herein relate to a non-transitory computer-readable medium that stores a set of instructions for wireless communication by a first base station. The set of instructions, when executed by one or more processors of the first base station, may cause the first base station to receive, from a UE, information indicating at least one of a service type associated with a QoE configuration, an RRC level identifier associated with the QoE configuration, a QoE reference associated with the QoE configuration, or a QMC associated with the QoE configuration. The set of instructions, when executed by one or more processors of the first base station, may cause the first base station to store an indication of the QoE configuration based at least in part on receiving the information indicating the at least one of the service type, the RRC level identifier, the QoE reference, or the QMC. The set of instructions, when executed by one or more processors of the first base station, may cause the first base station to provide the indication of the QoE configuration to a second base station during a triggering event associated with the UE.

Some aspects described herein relate to a non-transitory computer-readable medium that stores a set of instructions for wireless communication by a QoE server. The set of instructions, when executed by one or more processors of the QoE server, may cause the QoE server to receive a session start or stop indication at a UE. The set of instructions, when executed by one or more processors of the QoE server, may cause the QoE server to identify a QoE configuration associated with the ongoing QoE session based at least in part on the at least one of the service type or the QoE reference. The set of instructions, when executed by one or more processors of the QoE server, may cause the QoE server to provide information indicating the QoE configuration associated with the ongoing QoE session to a base station.

Some aspects described herein relate to a non-transitory computer-readable medium that stores a set of instructions for wireless communication by a one or more instructions that, when executed by one or more processors of an UE. The set of instructions, when executed by one or more processors of the one or more instructions that, when executed by one or more processors of an UE, may cause the one or more instructions that, when executed by one or more processors of an UE to initiate a QoE session for a QoE configuration, the QoE session being initiated at an application layer of the UE. The set of instructions, when executed by one or more processors of the one or more instructions that, when executed by one or more processors of an UE, may cause the one or more instructions that, when executed by one or more processors of an UE to provide a session start or stop indication at the UE, the session start or stop indication being provided from the application layer to a QoE server.

Some aspects described herein relate to a non-transitory computer-readable medium that stores a set of instructions for wireless communication by a first base station. The set of instructions, when executed by one or more processors of the first base station, may cause the first base station to receive, from a QoE server, information indicating a QoE configuration associated with an ongoing QoE session at a UE. The set of instructions, when executed by one or more processors of the first base station, may cause the first base station to store an indication of the QoE configuration based at least in part on receiving the information indicating the QoE configuration. The set of instructions, when executed by one or more processors of the first base station, may cause the first base station to provide the indication of the QoE configuration to a second base station during a triggering event associated with the UE.

Some aspects described herein relate to a non-transitory computer-readable medium that stores a set of instructions for wireless communication by a QoE server. The set of instructions, when executed by one or more processors of the QoE server, may cause the QoE server to determine whether a UE is located in an area associated with a QoE configuration configured on the UE. The set of instructions, when executed by one or more processors of the QoE server, may cause the QoE server to selectively release the QoE configuration based at least in part on the determination of whether the UE is located in the area associated with the QoE configuration.

Some aspects described herein relate to a non-transitory computer-readable medium that stores a set of instructions for wireless communication by a base station. The set of instructions, when executed by one or more processors of the base station, may cause the base station to provide, to a QoE server, at least one of. The set of instructions, when executed by one or more processors of the base station, may cause the base station to receive a command associated with releasing the QoE configuration configured on the UE.

Some aspects described herein relate to an apparatus for wireless communication. The apparatus may include means for initiating a QoE session for a QoE configuration, the QoE session being initiated at an application layer of the apparatus. The apparatus may include means for providing a session start or stop indication based at least in part on initiating the QoE session, the session start or stop indication being provided from the application layer to an RRC layer of the apparatus, where the session start or stop indication includes at least one of a service type associated with the QoE configuration, an RRC level identifier associated with the QoE configuration, a QoE reference associated with the QoE configuration, or a QMC associated with the QoE configuration. The apparatus may include means for providing, to a base station and based at least in part on the session start or stop indication, information indicating at least one of the service type associated with the QoE configuration, the RRC level identifier associated with the QoE configuration, the QoE reference associated with the QoE configuration, or the QMC associated with the QoE configuration.

Some aspects described herein relate to an apparatus for wireless communication. The apparatus may include means for receiving, from a UE, information indicating at least one of a service type associated with a QoE configuration, an RRC level identifier associated with the QoE configuration, a QoE reference associated with the QoE configuration, or a QMC associated with the QoE configuration, where the information indicating the at least one of the service type, the RRC level identifier, the QoE reference, or the QMC indicates there is an ongoing QoE session for the QoE configuration at the UE. The apparatus may include means for storing an indication of the QoE configuration based at least in part on receiving the information indicating the at least one of the service type, the RRC level identifier, the QoE reference, or the QMC. The apparatus may include means for providing the indication of the QoE configuration to a second base station during a triggering event associated with the UE.

Some aspects described herein relate to an apparatus for wireless communication. The apparatus may include means for receiving a session start or stop indication at a UE, where the session start or stop indication includes at least one of a service type associated with the ongoing QoE session or a QoE reference associated with the ongoing QoE session. The apparatus may include means for identifying a QoE configuration associated with the ongoing QoE session based at least in part on the at least one of the service type or the QoE reference. The apparatus may include means for providing information indicating the QoE configuration associated with the ongoing QoE session to a base station.

Some aspects described herein relate to an apparatus for wireless communication. The apparatus may include means for initiating a QoE session for a QoE configuration, the QoE session being initiated at an application layer of the apparatus. The apparatus may include means for providing a session start or stop indication at the apparatus, the session start or stop indication being provided from the application layer to a QoE server, where the session start or stop indication includes at least one of a service type associated with the ongoing QoE session, a QoE reference associated with the ongoing QoE session, or a session identifier associated with the ongoing QoE session.

Some aspects described herein relate to an apparatus for wireless communication. The apparatus may include means for receiving, from a QoE server, information indicating a QoE configuration associated with an ongoing QoE session at a UE. The apparatus may include means for storing an indication of the QoE configuration based at least in part on receiving the information indicating the QoE configuration. The apparatus may include means for providing the indication of the QoE configuration to a second base station during a triggering event associated with the UE.

Some aspects described herein relate to an apparatus for wireless communication. The apparatus may include means for determining whether a UE is located in an area associated with a QoE configuration configured on the UE. The apparatus may include means for selectively releasing the QoE configuration based at least in part on the determination of whether the UE is located in the area associated with the QoE configuration.

Some aspects described herein relate to an apparatus for wireless communication. The apparatus may include means for providing, to a QoE server, at least one of, information indicating whether a UE is located in an area associated with a QoE configuration configured for the UE, or information associated with a target cell of the UE. The apparatus may include means for receiving a command associated with releasing the QoE configuration configured on the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
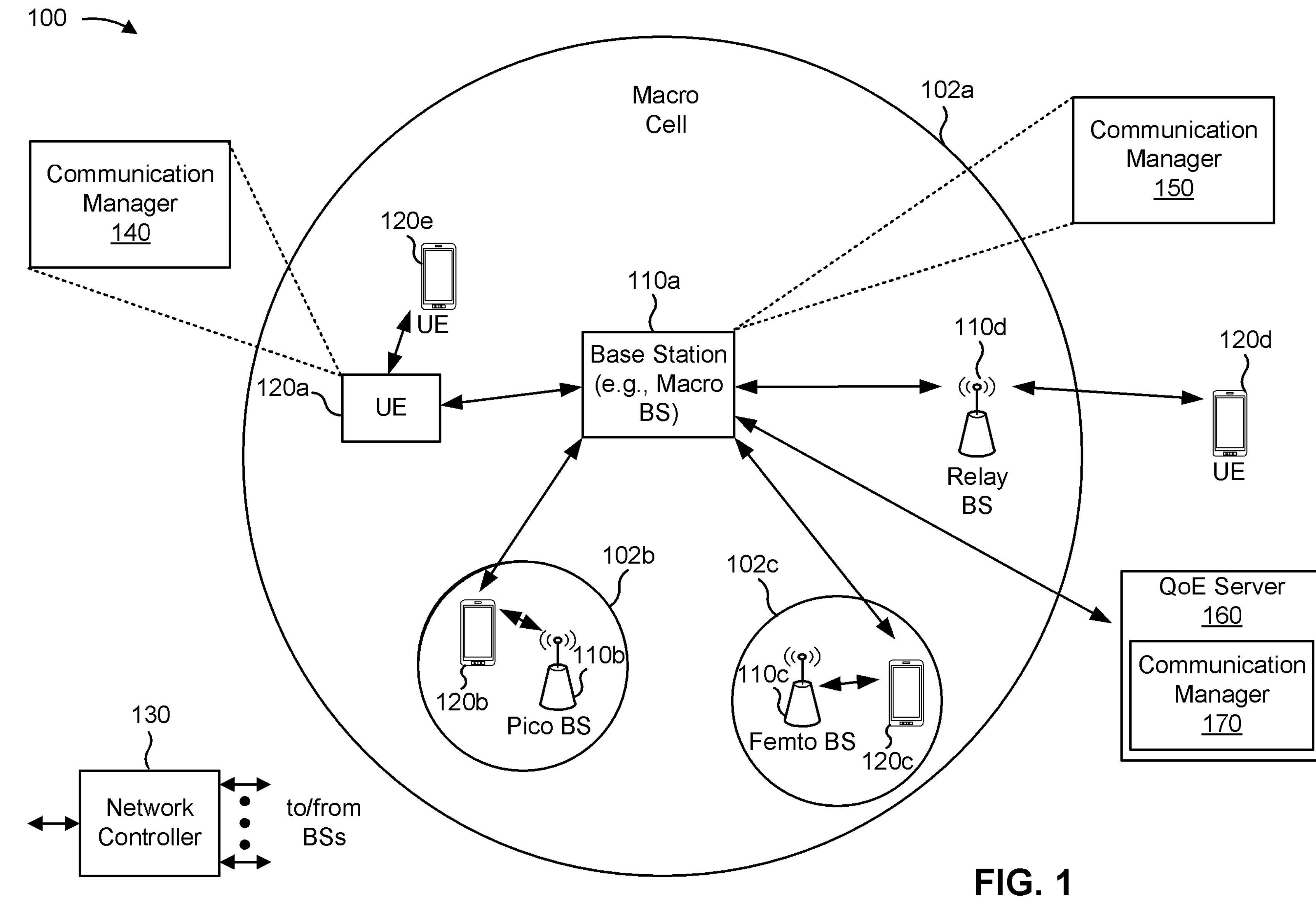
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), one or more quality of experience (QoE) devices 160, and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases. NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHZ" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may initiate a quality of experience (QoE) session for a QoE configuration, the QoE session being initiated at an application layer of the UE 120: provide a session start or stop indication based at least in part on initiating the QoE session, the session start or stop indication being provided from the application layer to a radio resource control (RRC) layer of the UE 120, wherein the session start or stop indication includes at least one of a service type associated with the QoE configuration, an RRC level identifier associated with the QoE configuration, a QoE reference associated with the QoE configuration, or a QoE management collection (QMC) associated with the QoE configuration; and provide, to a base station and based at least in part on the session start or stop indication, information indicating at least one of the service type associated with the QoE configuration, the RRC level identifier associated with the QoE configuration, the QoE reference associated with the QoE configuration, or the QMC associated with the QoE configuration. Additionally, or alternatively, the communication manager 140 may perform one or more other operations described herein.

In some aspects, the base station 110 may include a communication manager 150. As described in more detail elsewhere herein, the communication manager 150 may receive, from a UE 120, information indicating at least one of a service type associated with a QoE configuration, an RRC level identifier associated with the QoE configuration, a QoE reference associated with the QoE configuration, or a QMC associated with the QoE configuration, wherein the information indicating the at least one of the service type, the RRC level identifier, the QoE reference, or the QMC indicates there is an ongoing QoE session for the QoE configuration at the UE 120; store an indication of the QoE configuration based at least in part on receiving the information indicating the at least one of the service type, the RRC level identifier, the QoE reference, or the QMC; and provide the indication of the QoE configuration to a second base station 110 during a triggering event associated with the UE 120. Additionally, or alternatively, the communication manager 150 may perform one or more other operations described herein.

In some aspects, the QoE server 160 may include a communication manager 170. As described in more detail elsewhere herein, the communication manager 170 may receive a session start or stop indication at a UE 120, wherein the session start or stop indication includes at least one of a service type associated with the ongoing QoE session or a QE reference associated with the ongoing QoE session: identify a QoE configuration associated with the ongoing QoE session based at least in part on the at least one of the service type or the QoE reference; and provide information indicating the QoE configuration associated with the ongoing QoE session to a base station 110. Additionally, or alternatively, the communication manager 170 may perform one or more other operations described herein.

In some aspects, the UE 120 may include a communication manager 140. As described in more detail elsewhere herein, the communication manager 140 may initiate a QoE session for a QoE configuration, the QoE session being initiated at an application layer of the UE 120; and provide a session start or stop indication at the UE 120, the session start or stop indication being provided from the application layer to a QoE server 160, wherein the session start or stop indication includes at least one of a service type associated with the ongoing QoE session, a QoE reference associated with the ongoing QoE session, or a session identifier associated with the ongoing QoE session. Additionally, or alternatively, the communication manager 140 may perform one or more other operations described herein.

In some aspects, the base station 110 may include a communication manager 150. As described in more detail elsewhere herein, the communication manager 150 may receive, from a QoE server 160, information indicating a QoE configuration associated with an ongoing QoE session at a UE 120; store an indication of the QoE configuration based at least in part on receiving the information indicating the QoE configuration; and provide the indication of the QoE configuration to a second base station during a triggering event associated with the UE 120. Additionally, or alternatively, the communication manager 150 may perform one or more other operations described herein.

In some aspects, the QoE server 160 may include a communication manager 170. As described in more detail elsewhere herein, the communication manager 170 may determine whether a UE 120 is located in an area associated with a QoE configuration configured on the UE 120; and selectively release the QoE configuration based at least in part on the determination of whether the UE 120 is located in the area associated with the QoE configuration. Additionally, or alternatively, the communication manager 170 may perform one or more other operations described herein.

In some aspects, the base station 110 may include a communication manager 150. As described in more detail elsewhere herein, the communication manager 150 may provide, to a QoE server 160, at least one of: information indicating whether a UE 120 is located in an area associated with a QoE configuration configured for the UE 120, or information associated with a target cell of the UE 120; and receive a command associated with releasing the QoE configuration configured on the UE 120. Additionally, or alternatively, the communication manager 150 may perform one or more other operations described herein.

As indicated above. FIG. 1 is provided as an example. Other examples may differ from what is described with regard to FIG. 1.

Figure 2:
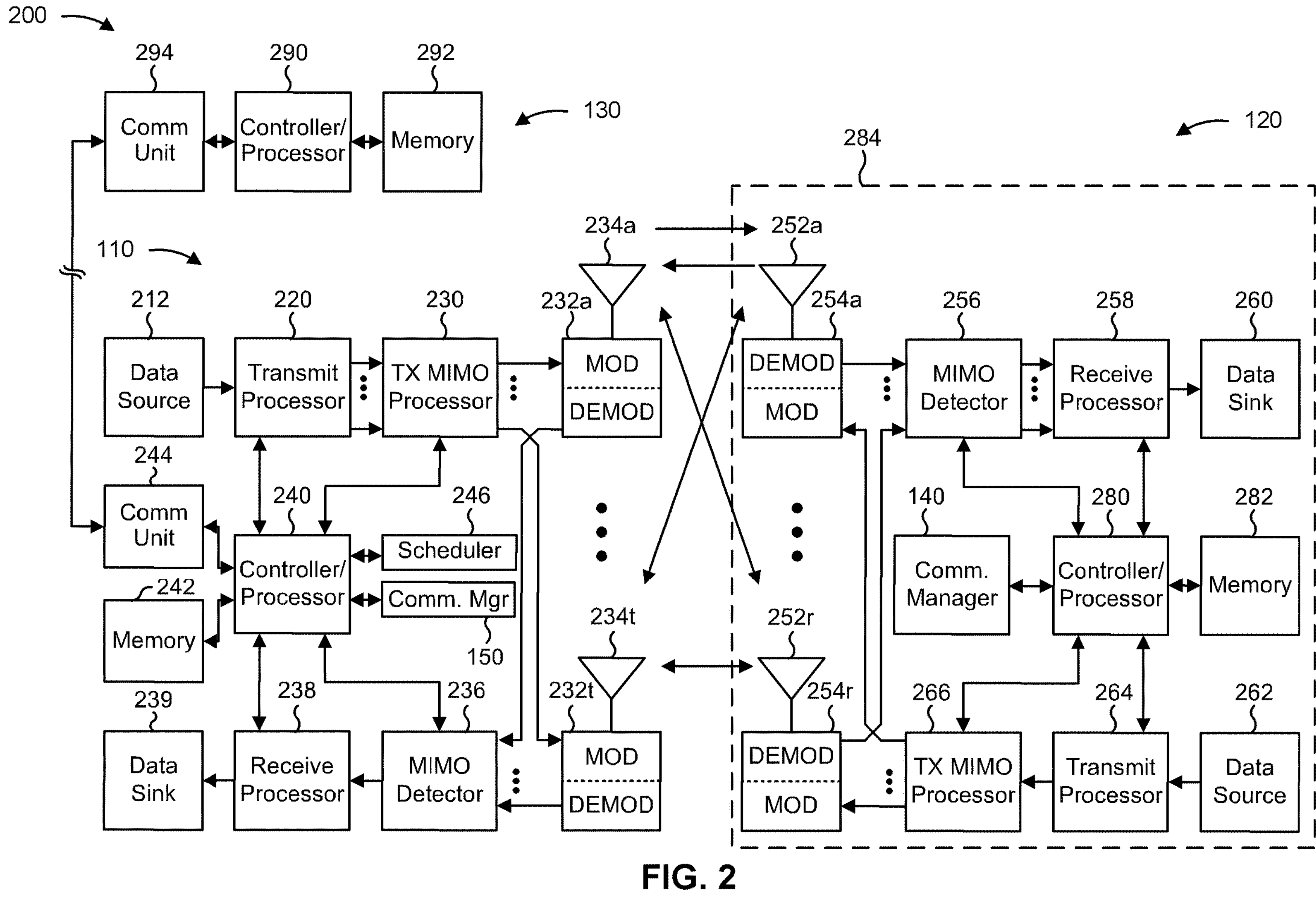
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas **234*a* through 234*t*, such as T antennas (T≥1). The UE 120 may be equipped with a set of antennas 252*a* through 252*r***, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems **232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t***.

At the UE 120, a set of antennas 252 (shown as antennas **252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284**.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP. RSSI. RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-14).

The controller/processor 240 of the base station 110, the controller/processor 280 of the UE 120, and/or any other component(s) of FIG. 2 may perform one or more techniques associated with QoE release when a UE 120 moves out of area scope, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, process 500 of FIG. 5, process 600 of FIG. 6, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, process 600 of FIG. 6, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE includes means for initiating a QoE session for a QoE configuration, the QoE session being initiated at an application layer of the UE: means for providing a session start or stop indication based at least in part on initiating the QoE session, the session start or stop indication being provided from the application layer to an RRC layer of the UE, wherein the session start or stop indication includes at least one of a service type associated with the QoE configuration, an RRC level identifier associated with the QoE configuration, a QE reference associated with the QoE configuration, or a QMC associated with the QoE configuration; and/or means for providing, to a base station and based at least in part on the session start or stop indication, information indicating at least one of the service type associated with the QoE configuration, the RRC level identifier associated with the QoE configuration, the QoE reference associated with the QoE configuration, or the QMC associated with the QoE configuration. The means for the UE to perform operations described herein may include, for example, one or more of communication manager 140, antenna 252, modem 254. MIMO detector 256, receive processor 258, transmit processor 264. TX MIMO processor 266, controller/processor 280, or memory 282.

In some aspects, a first base station includes means for receiving, from a UE, information indicating at least one of a service type associated with a QoE configuration or an RRC level identifier associated with the QoE configuration, a QoE reference associated with the QoE configuration, or a QMC associated with the QoE configuration, wherein the information indicating the at least one of the service type, the RRC level identifier, the QoE reference, or the QMC indicates there is an ongoing QoE session for the QoE configuration at the UE: means for storing an indication of the QoE configuration based at least in part on receiving the information indicating the at least one of the service type, the RRC level identifier, the QoE reference, or the QMC; and/or means for providing the indication of the QoE configuration to a second base station during a triggering event associated with the UE. The means for the first base station to perform operations described herein may include, for example, one or more of communication manager 150, transmit processor 220. TX MIMO processor 230, modem 232, antenna 234. MIMO detector 236, receive processor 238, controller/processor 240, memory 242, or scheduler 246.

In some aspects, a UE includes means for initiating a QoE session for a QoE configuration, the QoE session being initiated at an application layer of the UE; and/or means for providing a session start or stop indication at the UE, the session start or stop indication being provided from the application layer to a QoE server, wherein the session start or stop indication includes at least one of a service type associated with the ongoing QoE session, a QoE reference associated with the ongoing QoE session, or a session identifier associated with the ongoing QoE session. The means for the UE to perform operations described herein may include, for example, one or more of communication manager 140, antenna 252, modem 254. MIMO detector 256, receive processor 258, transmit processor 264. TX MIMO processor 266, controller/processor 280, or memory 282.

In some aspects, a first base station includes means for receiving, from a QoE server, information indicating a QoE configuration associated with an ongoing QoE session at a UE; means for storing an indication of the QoE configuration based at least in part on receiving the information indicating the QoE configuration; and/or means for providing the indication of the QoE configuration to a second base station during a triggering event associated with the UE. The means for the first base station to perform operations described herein may include, for example, one or more of communication manager 150, transmit processor 220. TX MIMO processor 230, modem 232, antenna 234. MIMO detector 236, receive processor 238, controller/processor 240, memory 242, or scheduler 246.

In some aspects, a base station includes means for providing, to a QoE server, at least one of: information indicating whether a UE is located in an area associated with a QoE configuration configured for the UE, or information associated with a target cell of the UE; and/or means for receiving a command associated with releasing the QoE configuration configured on the UE. The means for the base station to perform operations described herein may include, for example, one or more of communication manager 150, transmit processor 220. TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above. FIG. 2 is provided as an example. Other examples may differ from what is described with regard to FIG. 2.

Figure 3:
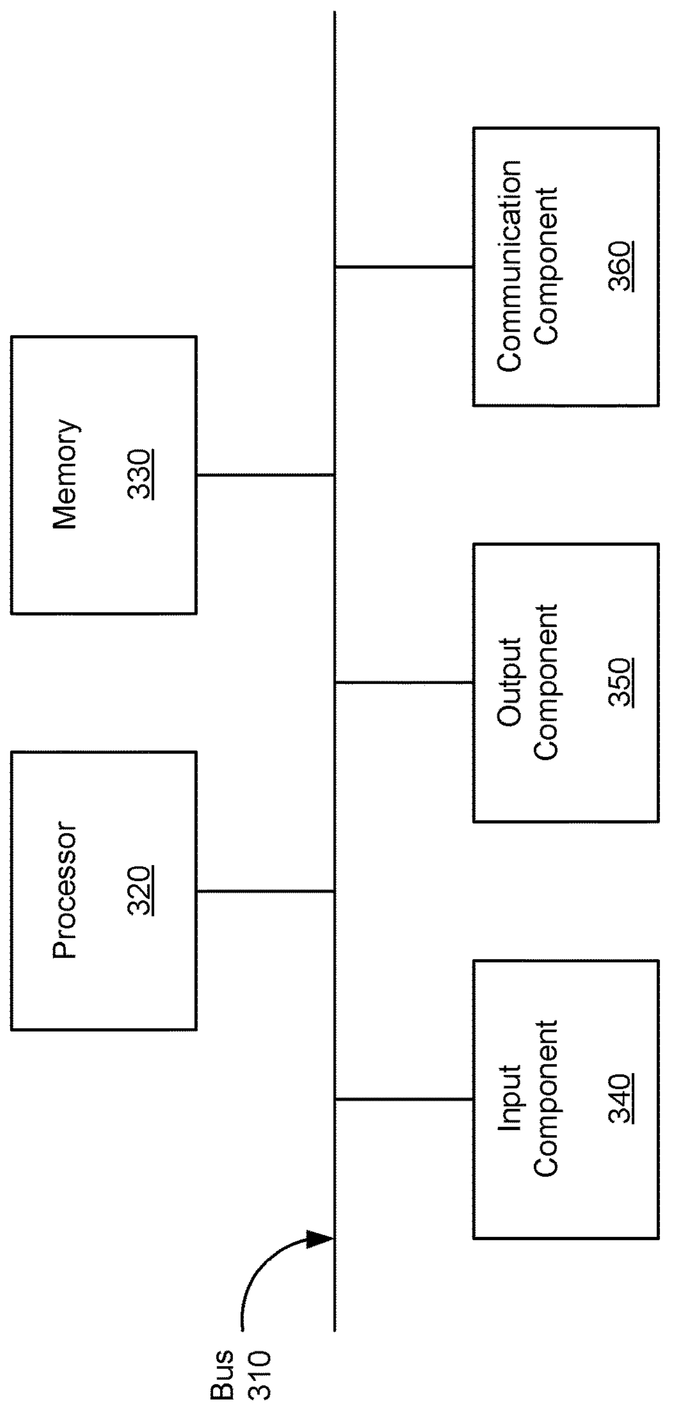
FIG. 3 is a diagram illustrating an example of a quality of experience (QoE) device, in accordance with the present disclosure.

FIG. 3 is a diagram of example components of a device 300, which may correspond to QoE server 160. In some implementations. QoE server 160 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM. ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

In some aspects, the device 300 includes means for receiving a session start or stop indication at a UE, wherein the session start or stop indication includes at least one of a service type associated with the ongoing QoE session or a QoE reference associated with the ongoing QoE session: means for identifying a QoE configuration associated with the ongoing QoE session based at least in part on the at least one of the service type or the QoE reference; and/or means for providing information indicating the QoE configuration associated with the ongoing QoE session to a base station. In some aspects, the means for the device 300 to perform operations described herein may include, for example, one or more of communication manager 170, bus 310, processor 320, memory 330, input component 340, output component 350, or communication component 360.

In some aspects, the device 300 includes means for determining whether a UE is located in an area associated with a QoE configuration configured on the UE; and/or means for selectively releasing the QoE configuration based at least in part on the determination of whether the UE is located in the area associated with the QoE configuration. In some aspects, the means for the device 300 to perform operations described herein may include, for example, one or more of communication manager 170, bus 310, processor 320, memory 330, input component 340, output component 350, or communication component 360.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In some wireless communication systems, a UE can be configured with a QoE measurement configuration (herein referred to as a QoE configuration). For example, a QoE device (referred to as a QoE server or a measurement collection entity (MCE)) may provide the QoE configuration to a base station. The base station may provide the QoE configuration to an RRC layer of the UE via an RRC configuration (e.g., an RRC reconfiguration message). In some cases, the RRC configuration includes the QoE configuration and information that identifies a service type associated with the QoE configuration (e.g., multimedia broadcast/multicast service (MBMS), streaming service, multimedia telephony service for Internet protocol multimedia subsystem (MTSI), or the like). The RRC layer of the UE receives the QoE configuration and forwards the QoE configuration to an application layer of the UE. The application layer of the UE initiates a QoE session according to the QoE configuration and provides QoE measurements (per service type) to the RRC layer. The RRC layer of the UE then reports the QoE measurements (per service type) to the base station, and the base station provides a corresponding QoE report to the QoE server.

In some cases, the QoE configuration to be provided to the application layer of the UE can be encapsulated in a transparent container and forwarded to the UE in a downlink RRC message. QoE measurements performed at the application layer can similarly be encapsulated in a transparent container and provided to the base station an uplink RRC message. Further, a QoE report is sent via a separate or dedicated signal radio bearer (SRB) in some cases because QoE reporting is lower priority than other SRB transmissions.

In operation, the network is responsible for keeping track of whether a UE is located inside or outside of an area associated with the QoE configuration, and the network configures or releases the QoE configuration accordingly. Thus, in the case of a handover, a target base station in some cases can check whether the UE is inside the area associated with the QoE configuration based on information received from a source base station. Subsequently, the target base station can release the QoE configuration if the QoE is no longer relevant for the UE (e.g., if the QoE configuration is not valid under the coverage of the target base station).

Further, there are QoE continuity requirements for ongoing QoE sessions. The continuity requirements state that a QoE configuration should only be checked by the client when a QoE session starts and, therefore, all logging and reporting criteria for an ongoing QoE session should be unaffected by any QoE configuration changes received during that QoE session (e.g., while the QoE session is ongoing). This includes evaluation of any filtering criteria, such as location filtering (e.g., geographical filtering), which should be done only when the QoE session starts. Thus, changes to the QoE configuration will affect only QoE sessions initiated after QoE configuration changes have been received.

There are a number of issues associated with the above-described operation for QoE configuration, measurement, and reporting. For example, for a given UE, multiple QoE configurations can be configured. Thus, the network (e.g., a base station) should know whether a given QoE configuration configured on the UE has an ongoing QoE session in order to allow the network to determine whether or not to release the QoE configuration in, for example, a scenario in which the UE moves out of an area associated with the QoE configuration (e.g., outside of a service area scope of the QoE configuration).

One possible technique to improve QoE continuity for an ongoing QoE session in the case of a UE moving out of an area associated with the QoE configuration is for the UE to indicate ongoing session information to the network (e.g., such that the UE indicates a session start or a session end associated with a given QoE configuration). However, the ongoing session information is an application layer concept and is agnostic at the network level. At the network level, only a QoE configuration identifier or service type associated with the QoE configuration is visible. Therefore, the network cannot derive a corresponding QoE configuration for a given ongoing QoE session reported by the UE. Further, a session start or session end indication can only indicate whether there is a session ongoing, and such an indication is not useful for the network to determine whether a given QoE configuration should be released.

Some techniques and apparatuses described herein enable improved QoE release when a UE moves out of area scope.

Figure 4:
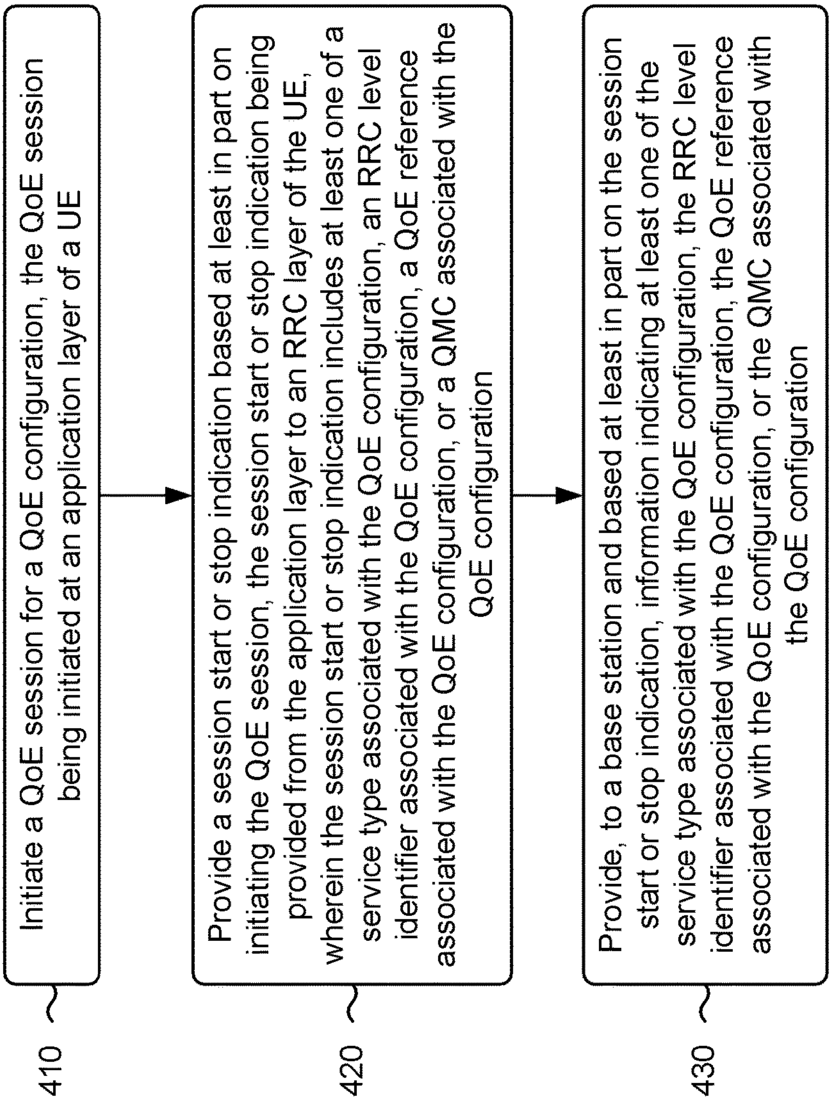
FIGS. 4-10 are diagrams illustrating example processes associated with QoE release when a UE moves out of area scope, in accordance with the present disclosure.

FIG. 4 is a diagram illustrating an example process 400 performed, for example, by a UE, in accordance with the present disclosure. Example process 400 is an example where the UE (e.g., UE 120) performs operations associated with QoE release when a UE moves out of area scope.

As shown in FIG. 4, in some aspects, process 400 may include initiating a QoE session for a QoE configuration, the QoE session being initiated at an application layer of the UE (block 410). For example, the UE (e.g., using communication manager 140 and/or QoE component 1108, depicted in FIG. 11) may initiate a QoE session for a QoE configuration, the QoE session being initiated at an application layer of the UE, as described above.

As further shown in FIG. 4, in some aspects, process 400 may include providing a session start or stop indication based at least in part on initiating the QoE session, the session start or stop indication being provided from the application layer to an RRC layer of the UE, wherein the session start or stop indication includes at least one of a service type associated with the QoE configuration, an RRC level identifier associated with the QoE configuration, a QoE reference associated with the QoE configuration, or a QMC associated with the QoE configuration (block 420). For example, the UE (e.g., using communication manager 140 and/or QoE component 1108, depicted in FIG. 11) may provide a session start or stop indication based at least in part on initiating the QoE session, the session start or stop indication being provided from the application layer to an RRC layer of the UE, wherein the session start or stop indication includes at least one of a service type associated with the QoE configuration, an RRC level identifier associated with the QoE configuration, a QoE reference associated with the QoE configuration, or a QMC associated with the QoE configuration, as described above.

As further shown in FIG. 4, in some aspects, process 400 may include providing, to a base station and based at least in part on the session start or stop indication, information indicating at least one of the service type associated with the QoE configuration, the RRC level identifier associated with the QoE configuration, the QoE reference associated with the QoE configuration, or the QMC associated with the QoE configuration (block 430). For example, the UE (e.g., using communication manager 140 and/or transmission component 1104, depicted in FIG. 11) may provide, to a base station and based at least in part on the session start or stop indication, information indicating at least one of the service type associated with the QoE configuration, the RRC level identifier associated with the QoE configuration, the QoE reference associated with the QoE configuration, or the QMC associated with the QoE configuration, as described above.

Process 400 may include additional aspects, such as any single aspect or any combination of aspects described below and/or in connection with one or more other processes described elsewhere herein.

In a first aspect, the session start or stop indication includes the RRC level identifier, based at least in part on the RRC level identifier being received at the application layer.

In a second aspect, alone or in combination with the first aspect, process 400 includes deriving the RRC level identifier at the RRC layer based at least in part on the session start or stop indication from the application layer including the QoE reference and not including the RRC level identifier.

In a third aspect, alone or in combination with one or more of the first and second aspects, process 400 includes receiving an RRC configuration at the RRC layer, the RRC configuration including the QoE configuration and at least one of the service type associated with the QoE configuration, the RRC level identifier associated with the QoE configuration, or the QoE reference associated with the QoE configuration, and forwarding at least the QoE configuration and the service type from the RRC layer to the application layer.

In a fourth aspect, alone or in combination with one or more of the first through third aspects, process 400 includes storing, at the RRC layer, information associated with a mapping between the RRC level identifier and the QoE reference based at least in part on the RRC configuration including the QoE reference.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
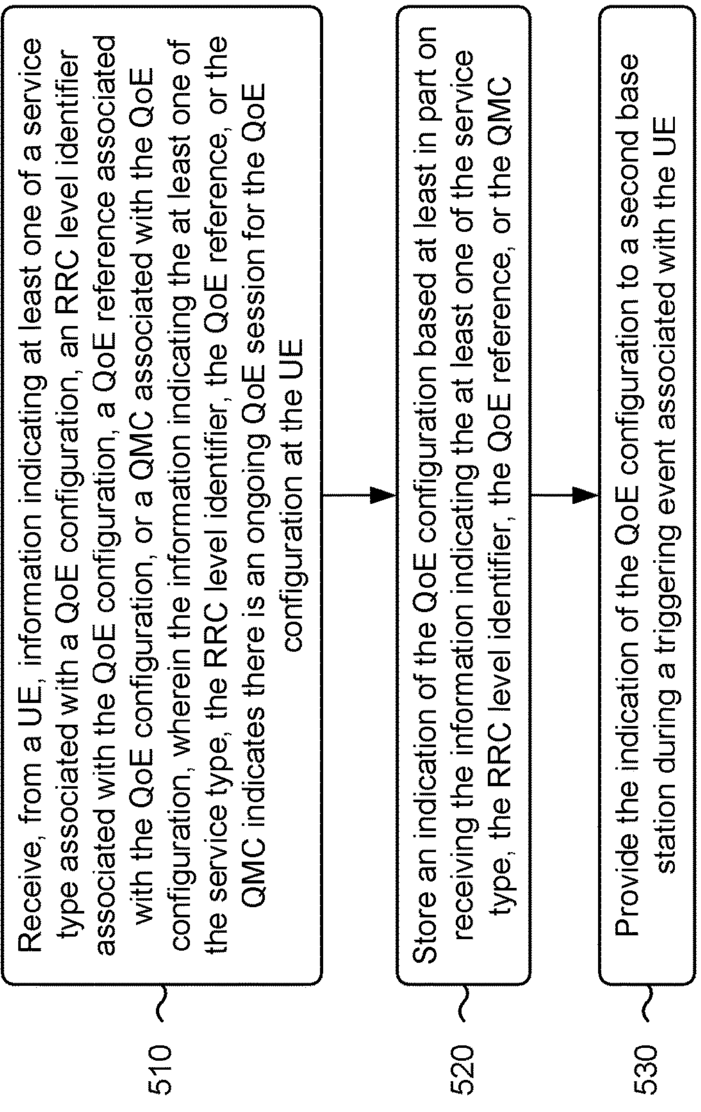

FIG. 5 is a diagram illustrating an example process 500 performed, for example, by a base station, in accordance with the present disclosure. Example process 500 is an example where the base station (e.g., base station 110) performs operations associated with QoE release when a UE moves out of area scope.

As shown in FIG. 5, in some aspects, process 500 may include receiving, from a UE, information indicating at least one of a service type associated with a QoE configuration, an RRC level identifier associated with the QoE configuration, a QoE reference associated with the QoE configuration, or a QMC associated with the QoE configuration, wherein the information indicating the at least one of the service type, the RRC level identifier, the QoE reference, or the QMC indicates there is an ongoing QoE session for the QoE configuration at the UE (block 510). For example, the base station (e.g., using communication manager 150 and/or reception component 1202, depicted in FIG. 12) may receive, from a UE, information indicating at least one of a service type associated with a QoE configuration, an RRC level identifier associated with the QoE configuration, a QoE reference associated with the QoE configuration, or a QMC associated with the QoE configuration, wherein the information indicating the at least one of the service type, the RRC level identifier, the QoE reference, or the QMC indicates there is an ongoing QoE session for the QoE configuration at the UE, as described above.

As further shown in FIG. 5, in some aspects, process 500 may include storing an indication of the QoE configuration based at least in part on receiving the information indicating the at least one of the service type, the RRC level identifier, the QoE reference, or the QMC (block 520). For example, the base station (e.g., using communication manager 150 and/or QoE component 1208, depicted in FIG. 12) may store an indication of the QoE configuration based at least in part on receiving the information indicating the at least one of the service type, the RRC level identifier, the QoE reference, or the QMC, as described above.

As further shown in FIG. 5, in some aspects, process 500 may include providing the indication of the QoE configuration to a second base station during a triggering event associated with the UE (block 530). For example, the base station (e.g., using communication manager 150 and/or transmission component 1204, depicted in FIG. 12) may provide the indication of the QoE configuration to a second base station during a triggering event associated with the UE, as described above.

Process 500 may include additional aspects, such as any single aspect or any combination of aspects described below and/or in connection with one or more other processes described elsewhere herein.

In a first aspect, the triggering event is a handover of the UE from the first base station to the second base station or a context retrieval associated with operation of the UE in an inactive state.

In a second aspect, alone or in combination with the first aspect, process 500 includes providing an RRC configuration to the UE, the RRC configuration including the QoE configuration and at least one of the service type associated with the QoE configuration, the RRC level identifier associated with the QoE configuration, or a QoE reference associated with the QoE configuration.

In a third aspect, alone or in combination with one or more of the first and second aspects, process 500 includes receiving the QoE configuration from a QoE server.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
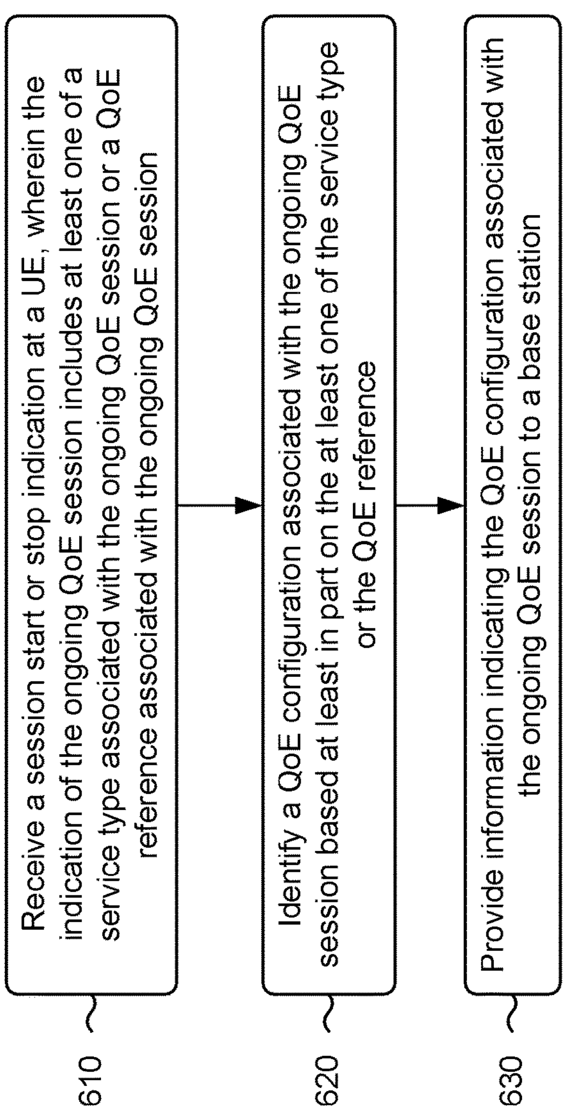

FIG. 6 is a diagram illustrating an example process 600 performed, for example, by a QoE server, in accordance with the present disclosure. Example process 600 is an example where the QoE server (e.g., QoE server 160) performs operations associated with QoE release when a UE moves out of area scope.

As shown in FIG. 6, in some aspects, process 600 may include receiving a session start or stop indication at a UE, wherein the session start or stop indication includes at least one of a service type associated with the ongoing QoE session or a QoE reference associated with the ongoing QoE session (block 610). For example, the QoE server (e.g., using communication manager 170 and/or reception component 1302, depicted in FIG. 13) may receive a session start or stop indication at a UE, wherein the session start or stop indication includes at least one of a service type associated with the ongoing QoE session or a QoE reference associated with the ongoing QoE session, as described above.

As further shown in FIG. 6, in some aspects, process 600 may include identifying a QoE configuration associated with the ongoing QoE session based at least in part on the at least one of the service type or the QoE reference (block 620). For example, the QoE server (e.g., using communication manager 170 and/or QoE component 1308, depicted in FIG. 13) may identify a QoE configuration associated with the ongoing QoE session based at least in part on the at least one of the service type or the QoE reference, as described above.

As further shown in FIG. 6, in some aspects, process 600 may include providing information indicating the QoE configuration associated with the ongoing QoE session to a base station (block 630). For example, the QoE server (e.g., using communication manager 170 and/or transmission component 1304, depicted in FIG. 13) may provide information indicating the QoE configuration associated with the ongoing QoE session to a base station, as described above.

Process 600 may include additional aspects, such as any single aspect or any combination of aspects described below and/or in connection with one or more other processes described elsewhere herein.

In a first aspect, the information indicating the QoE configuration includes at least one of the QoE reference, the service type, or a slice identifier associated with the QoE configuration.

In a second aspect, alone or in combination with the first aspect, the information indicating the QoE configuration is provided to the base station via a core network.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
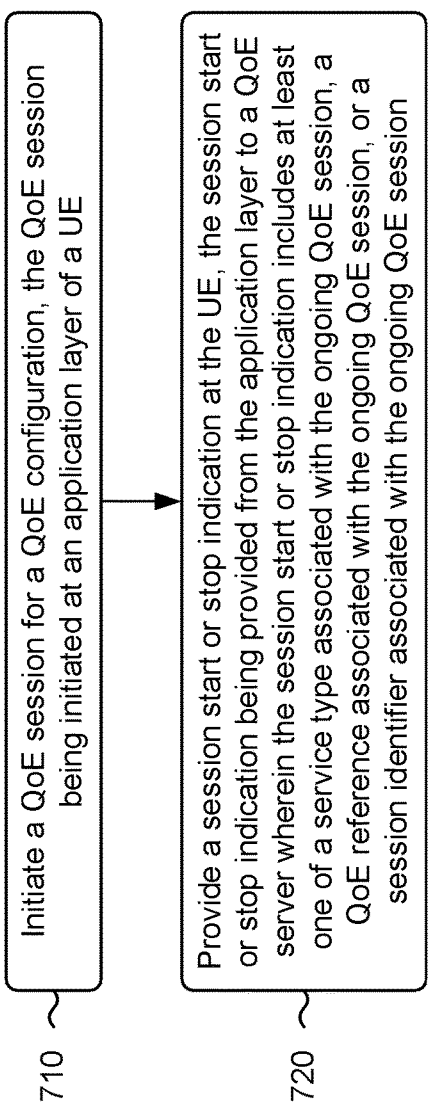
Figure 7:

FIG. 7 is a diagram illustrating an example process 700 performed, for example, by a UE, in accordance with the present disclosure. Example process 700 is an example where the UE (e.g., UE 120) performs operations associated with QoE release when a UE moves out of area scope.

As shown in FIG. 7, in some aspects, process 700 may include initiating a QoE session for a QoE configuration, the QoE session being initiated at an application layer of the UE (block 710). For example, the UE (e.g., using communication manager 140 and/or QoE component 1108, depicted in FIG. 11) may initiate a QoE session for a QoE configuration, the QoE session being initiated at an application layer of the UE, as described above.

As further shown in FIG. 7, in some aspects, process 700 may include providing a session start or stop indication (i.e., an indication of an ongoing QoE session) at the UE, the session start or stop indication being provided from the application layer to a QoE server, wherein the session start or stop indication includes at least one of a service type associated with the ongoing QoE session, a QoE reference associated with the ongoing QoE session, or a session identifier associated with the ongoing QoE session (block 720). For example, the UE (e.g., using communication manager 140 and/or transmission component 1104, depicted in FIG. 11) may provide a session start or stop indication at the UE, the session start or stop indication being provided from the application layer to a QoE server, wherein the session start or stop indication includes at least one of a service type associated with the ongoing QoE session, a QoE reference associated with the ongoing QoE session, or a session identifier associated with the ongoing QoE session, as described above.

Process 700 may include additional aspects, such as any single aspect or any combination of aspects described below and/or in connection with one or more other processes described elsewhere herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
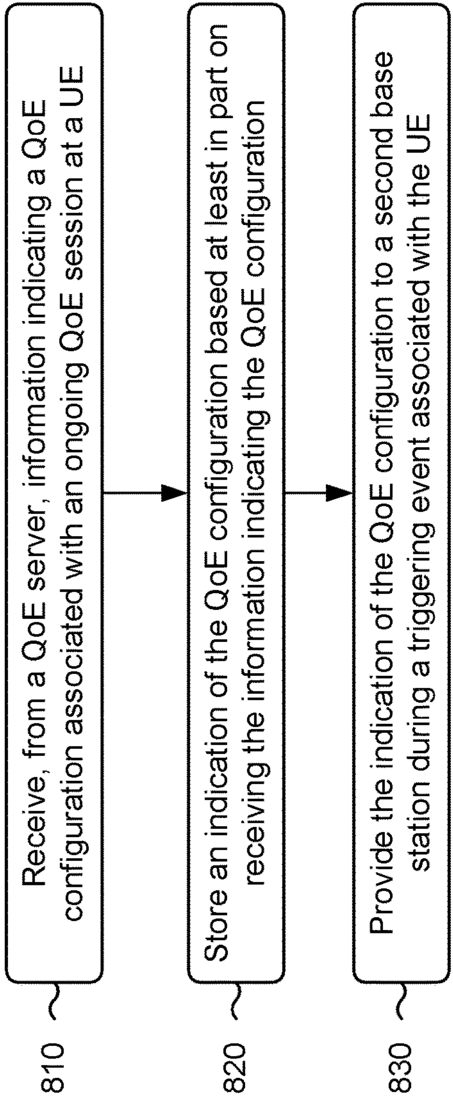

FIG. 8 is a diagram illustrating an example process 800 performed, for example, by a base station, in accordance with the present disclosure. Example process 800 is an example where the base station (e.g., base station 110) performs operations associated with QoE release when a UE moves out of area scope.

As shown in FIG. 8, in some aspects, process 800 may include receiving, from a QoE server, information indicating a QoE configuration associated with an ongoing QoE session at a UE (block 810). For example, the base station (e.g., using communication manager 150 and/or reception component 1202, depicted in FIG. 12) may receive, from a QoE server, information indicating a QoE configuration associated with an ongoing QoE session at a UE, as described above.

As further shown in FIG. 8, in some aspects, process 800 may include storing an indication of the QoE configuration based at least in part on receiving the information indicating the QoE configuration (block 820). For example, the base station (e.g., using communication manager 150 and/or QoE component 1208, depicted in FIG. 12) may store an indication of the QoE configuration based at least in part on receiving the information indicating the QoE configuration, as described above.

As further shown in FIG. 8, in some aspects, process 800 may include providing the indication of the QoE configuration to a second base station during a triggering event associated with the UE (block 830). For example, the base station (e.g., using communication manager 150 and/or transmission component 1204, depicted in FIG. 12) may provide the indication of the QoE configuration to a second base station during a triggering event associated with the UE, as described above.

Process 800 may include additional aspects, such as any single aspect or any combination of aspects described below and/or in connection with one or more other processes described elsewhere herein.

In a first aspect, the information indicating the QoE configuration includes at least one of a QoE reference associated with the QoE configuration, a service type associated with the QoE configuration, a slice identifier associated with the QoE configuration, or a session identifier associated with the ongoing QoE session.

In a second aspect, alone or in combination with the first aspect, the information indicating the QoE configuration is received via a core network.

In a third aspect, alone or in combination with one or more of the first and second aspects, the triggering event is a handover of the UE from the base station to another base station or a context retrieval associated with operation of the UE in an inactive state.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
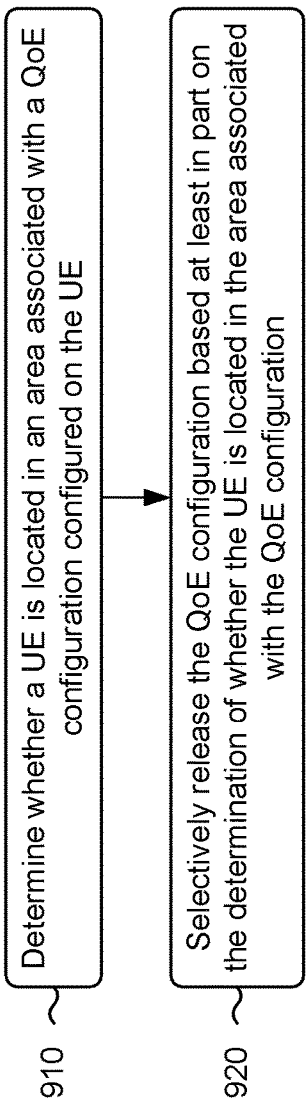

FIG. 9 is a diagram illustrating an example process 900 performed, for example, by a QoE server, in accordance with the present disclosure. Example process 900 is an example where the QoE server (e.g., QoE server 160) performs operations associated with QoE release when a UE moves out of area scope.

As shown in FIG. 9, in some aspects, process 900 may include determining whether a UE is located in an area associated with a QoE configuration configured on the UE (block 910). For example, the QoE server (e.g., using communication manager 170 and/or QoE component 1308, depicted in FIG. 13) may determine whether a UE is located in an area associated with a QoE configuration configured on the UE, as described above.

As further shown in FIG. 9, in some aspects, process 900 may include selectively releasing the QoE configuration based at least in part on the determination of whether the UE is located in the area associated with the QoE configuration (block 920). For example, the QoE server (e.g., using communication manager 170 and/or QoE component 1308, depicted in FIG. 13) may selectively release the QoE configuration based at least in part on the determination of whether the UE is located in the area associated with the QoE configuration, as described above.

Process 900 may include additional aspects, such as any single aspect or any combination of aspects described below and/or in connection with one or more other processes described elsewhere herein.

In a first aspect, selectively releasing the QoE configuration comprises releasing the QoE configuration based at least in part on a determination that the UE is not located in the area associated with the QoE configuration.

In a second aspect, alone or in combination with the first aspect, releasing the QoE configuration comprises providing a command associated with releasing the QoE configuration to a base station.

In a third aspect, alone or in combination with one or more of the first and second aspects, selectively releasing the QoE configuration comprises refraining from releasing the QoE configuration based at least in part on a determination that the UE is located in the area associated with the QoE configuration.

In a fourth aspect, alone or in combination with one or more of the first through third aspects, the determination of whether the UE is located in the area is based at least in part on information indicating whether the UE is located in the area received from a base station.

In a fifth aspect, alone or in combination with one or more of the first through fourth aspects, the determination of whether the UE is located in the area is based at least in part on information associated with a target cell of the UE received from a base station.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
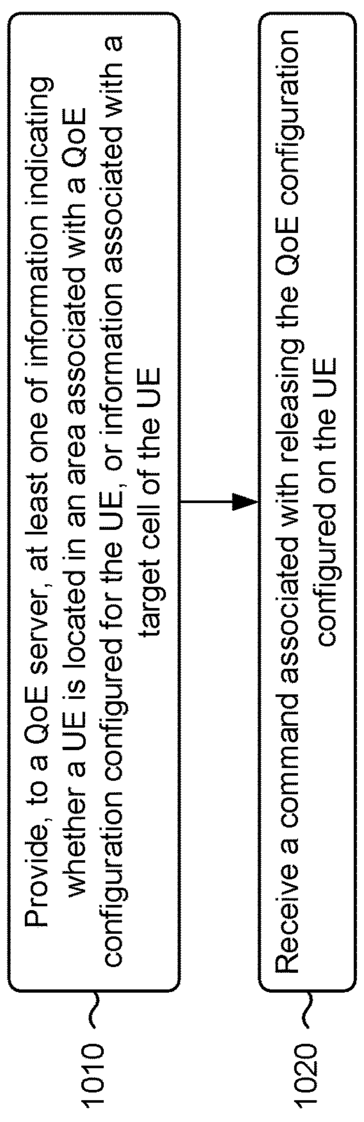

FIG. 10 is a diagram illustrating an example process 1000 performed, for example, by a base station, in accordance with the present disclosure. Example process 1000 is an example where the base station (e.g., base station 110) performs operations associated with QoE release when a UE moves out of area scope.

As shown in FIG. 10, in some aspects, process 1000 may include providing, to a QoE server, at least one of: information indicating whether a UE is located in an area associated with a QoE configuration configured for the UE, or information associated with a target cell of the UE (block 1010). For example, the base station (e.g., using communication manager 150 and/or transmission component 1204, depicted in FIG. 12) may provide, to a QoE server, at least one of: information indicating whether a UE is located in an area associated with a QoE configuration configured for the UE, or information associated with a target cell of the UE, as described above.

As further shown in FIG. 10, in some aspects, process 1000 may include receiving a command associated with releasing the QoE configuration configured on the UE (block 1020). For example, the base station (e.g., using communication manager 150 and/or reception component 1202, depicted in FIG. 12) may receive a command associated with releasing the QoE configuration configured on the UE, as described above.

Process 1000 may include additional aspects, such as any single aspect or any combination of aspects described below and/or in connection with one or more other processes described elsewhere herein.

In a first aspect, process 1000 includes providing the command associated with releasing the QoE configuration to the UE.

In a second aspect, alone or in combination with the first aspect, the at least one of the information indicating whether the UE is in the area or the information associated with the target cell is provided during a handover of the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
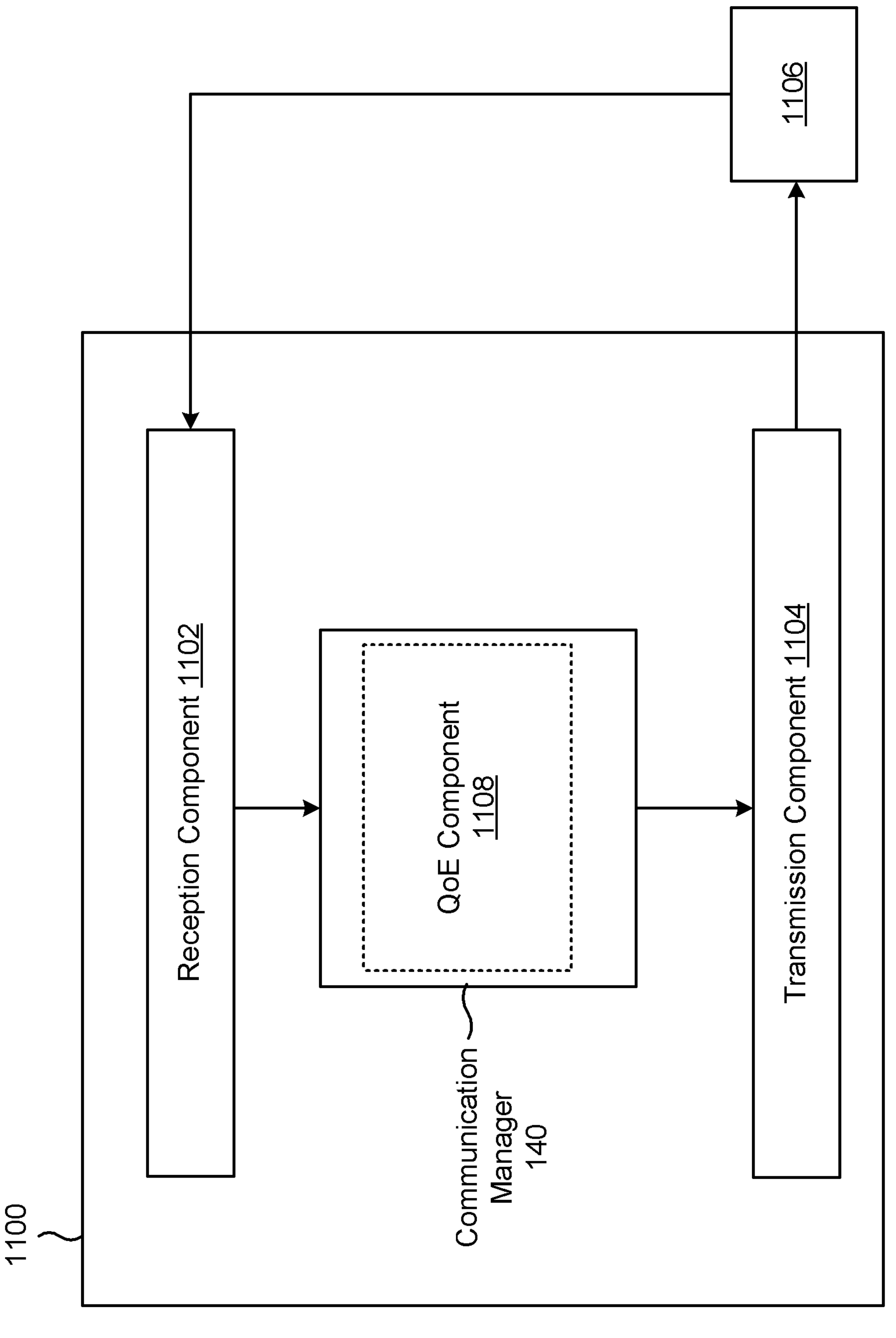
FIGS. 11-13 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a QoE component 1108, among other examples.

Figure 14:
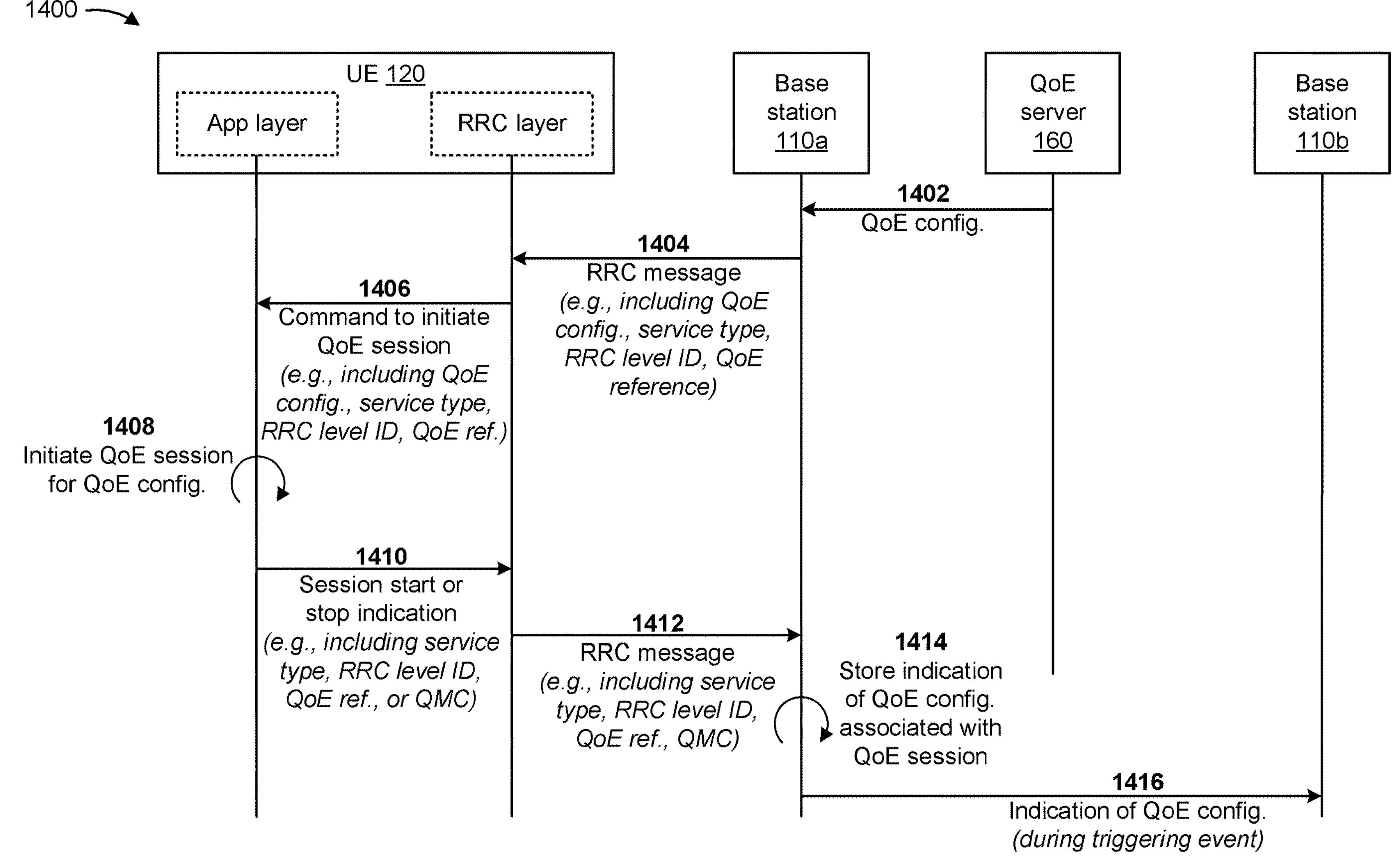
FIG. 14 is a diagram illustrating an example associated with QoE release when a UE moves out of area scope, in accordance with the present disclosure.

In some aspects, the apparatus 1100 may be configured to perform one or more operations described herein in connection with FIG. 14. Additionally, or alternatively, the apparatus 1100 may be configured to perform one or more processes described herein, such as process 400 of FIG. 4, process 700 of FIG. 7, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The QoE component 1108 may initiate a QoE session for a QoE configuration, the QoE session being initiated at an application layer of the UE. The QoE component 1108 may provide a session start or stop indication based at least in part on initiating the QoE session, the session start or stop indication being provided from the application layer to an RRC layer of the UE, wherein the session start or stop indication includes at least one of a service type associated with the QoE configuration, an RRC level identifier associated with the QoE configuration, a QoE reference associated with the QoE configuration, or a QMC associated with the QoE configuration. The transmission component 1104 may provide, to a base station and based at least in part on the session start or stop indication, information indicating at least one of the service type associated with the QoE configuration, the RRC level identifier associated with the QoE configuration, the QoE reference associated with the QoE configuration, or the QMC associated with the QoE configuration.

The QoE component 1108 may derive the RRC level identifier at the RRC layer based at least in part on the session start or stop indication from the application layer including the QoE reference and not including the RRC level identifier.

The reception component 1102 may receive an RRC configuration at the RRC layer, the RRC configuration including the QoE configuration and at least one of the service type associated with the QoE configuration, the RRC level identifier associated with the QoE configuration, or the QoE reference associated with the QoE configuration.

The QoE component 1108 may forward at least the QoE configuration and the service type from the RRC layer to the application layer.

The QoE component 1108 may store, at the RRC layer, information associated with a mapping between the RRC level identifier and the QoE reference The QoE component 1108 may initiate a QoE session for a QoE configuration, the QoE session being initiated at an application layer of the UE. The transmission component 1104 component may provide a session start or stop indication at the UE, the session start or stop indication being provided from the application layer to a QoE server, wherein the session start or stop indication includes at least one of a service type associated with the ongoing QoE session, a QoE reference associated with the ongoing QoE session, or a session identifier associated with the ongoing QoE session.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
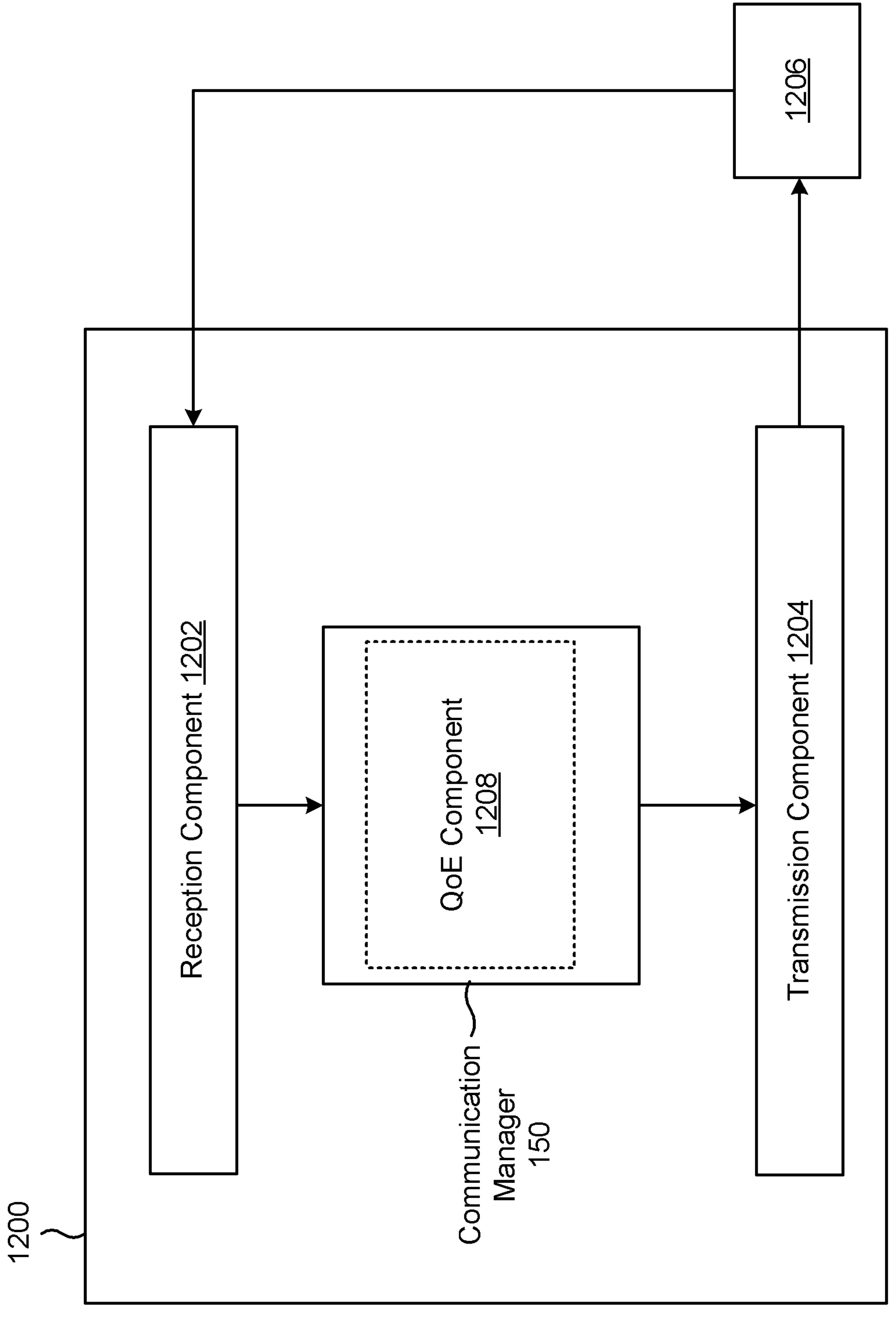

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204.

As further shown, the apparatus 1200 may include the communication manager 150. The communication manager 150 may include a QoE component 1208, among other examples.

In some aspects, the apparatus 1200 may be configured to perform one or more operations described herein in connection with FIG. 14. Additionally, or alternatively, the apparatus 1200 may be configured to perform one or more processes described herein, such as process 500 of FIG. 5, process 800 of FIG. 8, process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The reception component 1202 may receive, from a UE, information indicating at least one of a service type associated with a QoE configuration, an RRC level identifier associated with the QoE configuration, a QoE reference associated with the QoE configuration, or a QMC associated with the QoE configuration, wherein the information indicating the at least one of the service type, the RRC level identifier, the QoE reference, or the QMC indicates there is an ongoing QoE session for the QoE configuration at the UE. The QoE component 1208 may store an indication of the QoE configuration based at least in part on receiving the information indicating the at least one of the service type, the RRC level identifier, the QoE reference, or the QMC. The transmission component 1204 may provide the indication of the QoE configuration to a second base station during a triggering event associated with the UE.

The transmission component 1204 may provide an RRC configuration to the UE, the RRC configuration including the QoE configuration and at least one of the service type associated with the QoE configuration, the RRC level identifier associated with the QoE configuration, or a QoE reference associated with the QoE configuration.

The reception component 1202 may receive the QoE configuration from a QoE server.

The reception component 1202 may receive, from a QoE server, information indicating a QoE configuration associated with an ongoing QoE session at a UE. The QoE component 1208 may store an indication of the QoE configuration based at least in part on receiving the information indicating the QoE configuration. The transmission component 1204 may provide the indication of the QoE configuration to a second base station during a triggering event associated with the UE.

The transmission component 1204 may provide, to a QoE server, at least one of information indicating whether a UE is located in an area associated with a QoE configuration configured for the UE, or information associated with a target cell of the UE. The reception component 1202 may receive a command associated with releasing the QoE configuration configured on the UE.

The transmission component 1204 may provide the command associated with releasing the QoE configuration to the UE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
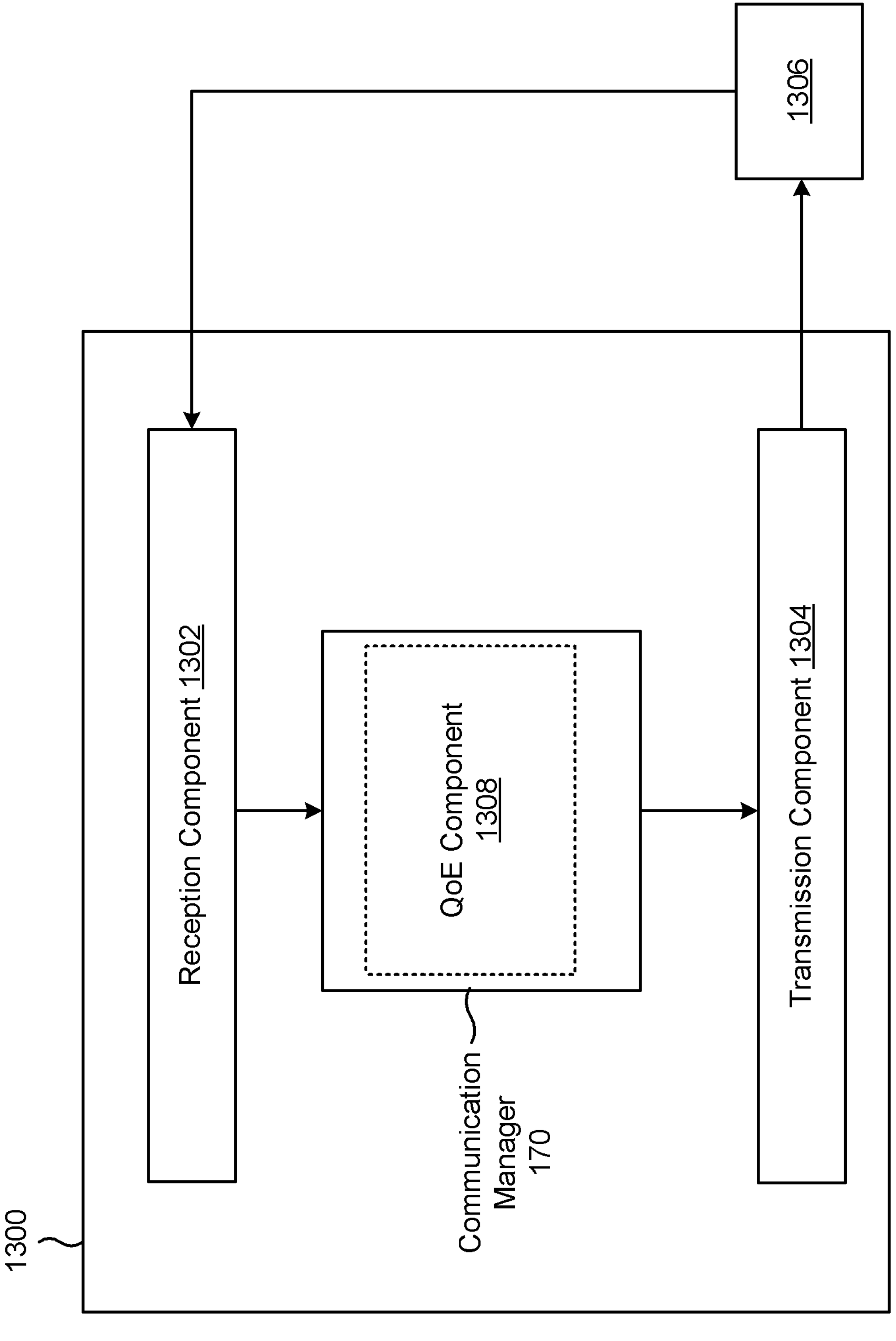

FIG. 13 is a diagram of an example apparatus 1300 for wireless communication. The apparatus 1300 may be a QoE server, or a QoE server may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 170. The communication manager 170 may include a QoE component 1308, among other examples.

In some aspects, the apparatus 1300 may be configured to perform one or more operations described herein in connection with FIG. 14. Additionally, or alternatively, the apparatus 1300 may be configured to perform one or more processes described herein, such as process 600 of FIG. 6, process 900 of FIG. 9, or a combination thereof. In some aspects, the apparatus 1300 and/or one or more components shown in FIG. 13 may include one or more components of the QoE server described in connection with FIG. 3. Additionally, or alternatively, one or more components shown in FIG. 13 may be implemented within one or more components described in connection with FIG. 3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the QoE server described in connection with FIG. 3.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the QoE server described in connection with FIG. 3. In some aspects, the transmission component 1304 may be co-located with the reception component 1302 in a transceiver.

The reception component 1302 may receive a session start or stop indication at a UE, wherein the session start or stop indication includes at least one of a service type associated with the ongoing QoE session or a QoE reference associated with the ongoing QoE session. The QoE component 1308 may identify a QoE configuration associated with the ongoing QoE session based at least in part on the at least one of the service type or the QoE reference. The transmission component 1304 may provide information indicating the QoE configuration associated with the ongoing QoE session to a base station.

The QoE component 1308 may determine whether a UE is located in an area associated with a QoE configuration configured on the UE. The QoE component 1308 may selectively release the QoE configuration based at least in part on the determination of whether the UE is located in the area associated with the QoE configuration.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

FIG. 14 is a diagram illustrating an example 1400 associated with QoE release when a UE moves out of area scope, in accordance with the present disclosure. As shown in FIG. 14, example 1400 includes communication between a first base station 110*a*, a second base station 110*b*, a UE 120, and a QoE server 160. In some aspects, the first base station 110*a*, the second base station 110*b*, the UE 120, or the QoE server 160 may be included in a wireless network, such as wireless network 100. In some aspects, the first base station 110*a*, the second base station 110*b*, the UE 120, or the QoE server 160 may communicate via a wireless access link, which may include an uplink and a downlink. In example 1400, there is an RRC connection between the UE 120 and the first base station 110*a*.

As shown by reference 1402, the QoE server 160 may transmit, and the first base station 110*a* may receive, a QoE configuration to be configured on the UE 120.

As shown by reference 1404, the first base station 110*a* may transmit, and an RRC layer of the UE 120 may receive, an RRC message (e.g., an RRC reconfiguration message) including the QoE configuration. In some aspects, the RRC message includes one or more other items of information associated with the QoE configuration, such as a service type associated with the QoE configuration, an RRC level identifier (ID) associated with the QoE configuration, or a QoE reference associated with the QoE configuration, among other examples. In some aspects, if a QoE reference is included in the QoE configuration, then the RRC layer of the UE 120 may store information associated with a mapping between the RRC level ID and the QoE reference.

As shown by reference 1406, based at least in part on receiving the RRC message including the QoE configuration, the RRC layer of the UE 120 provides a command to an application layer of the UE 120 to cause the application layer of the UE 120 to initiate a QoE based at least in part on the QoE configuration. As shown, the command may include the QoE configuration and one or more of the other items of information associated with the QoE configuration (e.g., the service type, the RRC level ID, the QoE reference, or the like).

As shown by reference 1408, the application layer of the UE 120 may initiate a QoE session for the QoE configuration. In some aspects, the application layer of the UE 120 may initiate the QoE session based at least in part on the command from the RRC layer of the UE 120.

As shown by reference 1410, the application layer of the UE 120 may provide, to the RRC layer of the UE 120, a session start or stop indication based at least in part on initiating the QoE session associated with the QoE configuration. In some aspects, the session start or stop indication includes at least one of the service type associated with the QoE configuration, the RRC level ID associated with the QoE configuration, the QoE reference, or a QMC associated with the QoE configuration. In some aspects, if the RRC level ID associated with the QoE configuration was provided to the application layer, then the application layer includes the RRC level ID in the session start or stop indication. In this way, the application layer of the UE 120 can indicate, to the RRC layer of the UE 120, one or more items of information associated with the QoE configuration based at least in part on initiating a corresponding QoE session at the UE 120.

As shown by reference 1412, based at least in part on the session start or stop indication, the RRC layer of the UE 120 may provide, and the first base station 110*a* may receive, an RRC message including one or more items of information associated with the QoE configuration. In some aspects, the one or more items of information provided to the first base station 110*a* by the RRC layer of the UE 120 may include, for example, information indicating the service type associated with the QoE configuration, the RRC level ID associated with the QoE configuration, the QoE reference associated with the QoE configuration, or the QMC associated with the QoE configuration. In this way, the UE 120 may indicate, to the first base station 110*a*, information associated with a given QoE configuration for which a QoE session has been initiated at the UE 120.

In some aspects, the UE 120 may derive the RRC level ID at the RRC layer based at least in part on the session start or stop indication including the QoE reference and not including the RRC level ID. That is, in some aspects, if the session start or stop indication includes the QoE reference and does not include the RRC level ID, then the UE 120 may derive the RRC level ID at the RRC layer (e.g., based at least in part on the stored information associated with the mapping between the RRC level ID and the QoE reference, as described above). In this way, the RRC layer of the UE 120 can derive the RRC level ID according to the QoE reference received from the application layer of the UE 120.

In some aspects, the first base station 110*a* may receive the RRC message including the service type, the RRC level ID, the QoE reference, or the QMC. Here, the one or more items of information may indicate to the first base station 110*a* that there is an ongoing QoE session for the QoE configuration at the UE 120.

As shown by reference 1414, the first base station 110*a* may store an indication of the QoE configuration based at least in part on receiving the information indicating the service type, the RRC level ID, the QoE reference, or the QMC.

As shown by reference 1416, at a later time, the first base station 110*a* may provide, and a second base station 110*b* may receive, the indication of the QoE configuration during a triggering event associated with the UE 120. In some aspects, the triggering event may be a handover of the UE 120 from the first base station 110*a* to the second base station 110*b*. Additionally, or alternatively, the triggering event may be a context retrieval associated with operation of the UE 120 in an inactive state.

In this way, the first base station 110*a* (e.g., a source base station 110) can indicate the QoE configuration to the second base station 110*b* (e.g., a target base station 110) during a triggering event, thereby informing the second base station 110*b* of the QoE configuration associated with a QoE session initiated at the UE 120.

As indicated above. FIG. 14 is provided as an example. Other examples may differ from what is described with respect to FIG. 14.

The following provides an overview of some Aspects of the present disclosure:

Aspect 1: A method of wireless communication performed by a UE, comprising: initiating a QoE session for a QoE configuration, the QoE session being initiated at an application layer of the UE: providing a session start or stop indication based at least in part on initiating the QoE session, the session start or stop indication being provided from the application layer to an RRC layer of the UE, wherein the session start or stop indication includes at least one of a service type associated with the QoE configuration, an RRC level identifier associated with the QoE configuration, a QoE reference associated with the QoE configuration, or a QMC associated with the QoE configuration; and providing, to a base station and based at least in part on the session start or stop indication, information indicating at least one of the service type associated with the QoE configuration, the RRC level identifier associated with the QoE configuration, the QoE reference associated with the QoE configuration, or the QMC associated with the QoE configuration.

Aspect 2: The method of Aspect 1, wherein the session start or stop indication includes the RRC level identifier, based at least in part on the RRC level identifier being received at the application layer.

Aspect 3: The method of any of Aspects 1-2, further comprising deriving the RRC level identifier at the RRC layer based at least in part on the session start or stop indication from the application layer including the QoE reference and not including the RRC level identifier.

Aspect 4: The method of any of Aspects 1-3, further comprising: receiving an RRC configuration at the RRC layer, the RRC configuration including the QoE configuration and at least one of the service type associated with the QoE configuration, the RRC level identifier associated with the QoE configuration, or the QoE reference associated with the QoE configuration, and forwarding at least the QoE configuration and the service type from the RRC layer to the application layer.

Aspect 5: The method of Aspect 4, further comprising storing, at the RRC layer, information associated with a mapping between the RRC level identifier and the QoE reference based at least in part on the RRC configuration including the QoE reference.

Aspect 6: A method of wireless communication performed by a first base station, comprising: receiving, from a UE, information indicating at least one of a service type associated with a QoE configuration, an RRC level identifier associated with the QoE configuration, a QoE reference associated with the QoE configuration, or a QMC associated with the QoE configuration, wherein the information indicating the at least one of the service type, the RRC level identifier, the QoE reference, or the QMC indicates there is an ongoing QoE session for the QoE configuration at the UE: storing an indication of the QoE configuration based at least in part on receiving the information indicating the at least one of the service type, the RRC level identifier, the QoE reference, or the QMC; and providing the indication of the QoE configuration to a second base station during a triggering event associated with the UE.

Aspect 7: The method of Aspect 6, wherein the triggering event is a handover of the UE from the first base station to the second base station or a context retrieval associated with operation of the UE in an inactive state.

Aspect 8: The method of any of Aspects 6-7, further comprising providing an RRC configuration to the UE, the RRC configuration including the QoE configuration and at least one of the service type associated with the QoE configuration, the RRC level identifier associated with the QoE configuration, or a QoE reference associated with the QoE configuration.

Aspect 9: The method of any of Aspects 6-8, further comprising receiving the QoE configuration from a QoE server.

Aspect 10: A method of wireless communication performed by a QoE server, comprising: receiving a session start or stop indication at a UE, wherein the session start or stop indication includes at least one of a service type associated with the ongoing QoE session or a QoE reference associated with the ongoing QoE session: identifying a QoE configuration associated with the ongoing QoE session based at least in part on the at least one of the service type or the QoE reference; and providing information indicating the QoE configuration associated with the ongoing QoE session to a base station.

Aspect 11: The method of Aspect 10, wherein the information indicating the QoE configuration includes at least one of the QoE reference, the service type, or a slice identifier associated with the QoE configuration.

Aspect 12: The method of any of Aspects 10-11, wherein the information indicating the QoE configuration is provided to the base station via a core network.

Aspect 13: A method of wireless communication performed by a UE, comprising: initiating a QoE session for a QoE configuration, the QoE session being initiated at an application layer of the UE; and providing a session start or stop indication at the UE, the session start or stop indication being provided from the application layer to a QoE server, wherein the session start or stop indication includes at least one of a service type associated with the ongoing QoE session, a QoE reference associated with the ongoing QoE session, or a session identifier associated with the ongoing QoE session.

Aspect 14: A method of wireless communication performed by a first base station, comprising: receiving, from a QoE server, information indicating a QoE configuration associated with an ongoing QoE session at a UE: storing an indication of the QoE configuration based at least in part on receiving the information indicating the QoE configuration; and providing the indication of the QoE configuration to a second base station during a triggering event associated with the UE.

Aspect 15: The method of Aspect 14, wherein the information indicating the QoE configuration includes at least one of a QoE reference associated with the QoE configuration, a service type associated with the QoE configuration, a slice identifier associated with the QoE configuration, or a session identifier associated with the QoE session.

Aspect 16: The method of any of Aspects 14-15, wherein the information indicating the QoE configuration is received via a core network.

Aspect 17: The method of any of Aspects 14-16, wherein the triggering event is a handover of the UE from the base station to another base station or a context retrieval associated with operation of the UE in an inactive state.

Aspect 18: A method of wireless communication performed by a QoE server, comprising: determining whether a UE is located in an area associated with a QoE configuration configured on the UE; and selectively releasing the QoE configuration based at least in part on the determination of whether the UE is located in the area associated with the QoE configuration.

Aspect 19: The method of Aspect 18, wherein selectively releasing the QoE configuration comprises releasing the QoE configuration based at least in part on a determination that the UE is not located in the area associated with the QoE configuration.

Aspect 20: The method of Aspect 19, wherein releasing the QoE configuration comprises providing a command associated with releasing the QoE configuration to a base station.

Aspect 21: The method of Aspect 18, wherein selectively releasing the QoE configuration comprises refraining from releasing the QoE configuration based at least in part on a determination that the UE is located in the area associated with the QoE configuration.

Aspect 22: The method of any of Aspects 18-21, wherein the determination of whether the UE is located in the area is based at least in part on information indicating whether the UE is located in the area received from a base station.

Aspect 23: The method of any of Aspects 18-22, wherein the determination of whether the UE is located in the area is based at least in part on information associated with a target cell of the UE received from a base station.

Aspect 24: A method of wireless communication performed by a base station, comprising: providing, to a QoE server, at least one of: information indicating whether a UE is located in an area associated with a QoE configuration configured for the UE, or information associated with a target cell of the UE; and receiving a command associated with releasing the QoE configuration configured on the UE.

Aspect 25: The method of Aspect 24, further comprising providing the command associated with releasing the QoE configuration to the UE.

Aspect 26: The method of any of Aspects 24-25, wherein the at least one of the information indicating whether the UE is in the area or the information associated with the target cell is provided during a handover of the UE.

Aspect 27: An apparatus for wireless communication at a device, comprising a processor; memory coupled with the processor; and instructions stored in the memory and executable by the processor to cause the apparatus to perform the method of one or more of Aspects 1-5.

Aspect 28: A device for wireless communication, comprising a memory and one or more processors coupled to the memory, the one or more processors configured to perform the method of one or more of Aspects 1-5.

Aspect 29: An apparatus for wireless communication, comprising at least one means for performing the method of one or more of Aspects 1-5.

Aspect 30: A non-transitory computer-readable medium storing code for wireless communication, the code comprising instructions executable by a processor to perform the method of one or more of Aspects 1-5.

Aspect 31: A non-transitory computer-readable medium storing a set of instructions for wireless communication, the set of instructions comprising one or more instructions that, when executed by one or more processors of a device, cause the device to perform the method of one or more of Aspects 1-5.

Aspect 32: An apparatus for wireless communication at a device, comprising a processor; memory coupled with the processor; and instructions stored in the memory and executable by the processor to cause the apparatus to perform the method of one or more of Aspects 6-9.

Aspect 33: A device for wireless communication, comprising a memory and one or more processors coupled to the memory, the one or more processors configured to perform the method of one or more of Aspects 6-9.

Aspect 34: An apparatus for wireless communication, comprising at least one means for performing the method of one or more of Aspects 6-9.

Aspect 35: A non-transitory computer-readable medium storing code for wireless communication, the code comprising instructions executable by a processor to perform the method of one or more of Aspects 6-9.

Aspect 36: A non-transitory computer-readable medium storing a set of instructions for wireless communication, the set of instructions comprising one or more instructions that, when executed by one or more processors of a device, cause the device to perform the method of one or more of Aspects 6-9.

Aspect 37: An apparatus for wireless communication at a device, comprising a processor; memory coupled with the processor; and instructions stored in the memory and executable by the processor to cause the apparatus to perform the method of one or more of Aspects 10-12.

Aspect 38: A device for wireless communication, comprising a memory and one or more processors coupled to the memory, the one or more processors configured to perform the method of one or more of Aspects 10-12.

Aspect 39: An apparatus for wireless communication, comprising at least one means for performing the method of one or more of Aspects 10-12.

Aspect 40: A non-transitory computer-readable medium storing code for wireless communication, the code comprising instructions executable by a processor to perform the method of one or more of Aspects 10-12.

Aspect 41: A non-transitory computer-readable medium storing a set of instructions for wireless communication, the set of instructions comprising one or more instructions that, when executed by one or more processors of a device, cause the device to perform the method of one or more of Aspects 10-12.

Aspect 42: An apparatus for wireless communication at a device, comprising a processor; memory coupled with the processor; and instructions stored in the memory and executable by the processor to cause the apparatus to perform the method of Aspect 13.

Aspect 43: A device for wireless communication, comprising a memory and one or more processors coupled to the memory, the one or more processors configured to perform the method of Aspect 13.

Aspect 44: An apparatus for wireless communication, comprising at least one means for performing the method of Aspect 13.

Aspect 45: A non-transitory computer-readable medium storing code for wireless communication, the code comprising instructions executable by a processor to perform the method of Aspect 13.

Aspect 46: A non-transitory computer-readable medium storing a set of instructions for wireless communication, the set of instructions comprising one or more instructions that, when executed by one or more processors of a device, cause the device to perform the method of Aspect 13.

Aspect 47: An apparatus for wireless communication at a device, comprising a processor; memory coupled with the processor; and instructions stored in the memory and executable by the processor to cause the apparatus to perform the method of one or more of Aspects 14-17.

Aspect 48: A device for wireless communication, comprising a memory and one or more processors coupled to the memory, the one or more processors configured to perform the method of one or more of Aspects 14-17.

Aspect 49: An apparatus for wireless communication, comprising at least one means for performing the method of one or more of Aspects 14-17.

Aspect 50: A non-transitory computer-readable medium storing code for wireless communication, the code comprising instructions executable by a processor to perform the method of one or more of Aspects 14-17.

Aspect 51: A non-transitory computer-readable medium storing a set of instructions for wireless communication, the set of instructions comprising one or more instructions that, when executed by one or more processors of a device, cause the device to perform the method of one or more of Aspects 14-17.

Aspect 52: An apparatus for wireless communication at a device, comprising a processor; memory coupled with the processor; and instructions stored in the memory and executable by the processor to cause the apparatus to perform the method of one or more of Aspects 18-23.

Aspect 53: A device for wireless communication, comprising a memory and one or more processors coupled to the memory, the one or more processors configured to perform the method of one or more of Aspects 18-23.

Aspect 54: An apparatus for wireless communication, comprising at least one means for performing the method of one or more of Aspects 18-23.

Aspect 55: A non-transitory computer-readable medium storing code for wireless communication, the code comprising instructions executable by a processor to perform the method of one or more of Aspects 18-23.

Aspect 56: A non-transitory computer-readable medium storing a set of instructions for wireless communication, the set of instructions comprising one or more instructions that, when executed by one or more processors of a device, cause the device to perform the method of one or more of Aspects 18-23.

Aspect 57: An apparatus for wireless communication at a device, comprising a processor; memory coupled with the processor; and instructions stored in the memory and executable by the processor to cause the apparatus to perform the method of one or more of Aspects 24-26.

Aspect 58: A device for wireless communication, comprising a memory and one or more processors coupled to the memory, the one or more processors configured to perform the method of one or more of Aspects 24-26.

Aspect 59: An apparatus for wireless communication, comprising at least one means for performing the method of one or more of Aspects 24-26.

Aspect 60: A non-transitory computer-readable medium storing code for wireless communication, the code comprising instructions executable by a processor to perform the method of one or more of Aspects 24-26.

Aspect 61: A non-transitory computer-readable medium storing a set of instructions for wireless communication, the set of instructions comprising one or more instructions that, when executed by one or more processors of a device, cause the device to perform the method of one or more of Aspects 24-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein. "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

initiate a quality of experience (QoE) session for a QoE configuration, the QoE session being initiated at an application layer of the UE;

provide a session start or stop indication based at least in part on initiating the QoE session, the session start or stop indication being provided from the application layer to a radio resource control (RRC) layer of the UE, wherein the session start or stop indication includes at least one of a service type associated with the QoE configuration, an RRC level identifier associated with the QoE configuration, a QoE reference associated with the QoE configuration, or a QoE measurement collection (QMC) associated with the QoE configuration; and provide, to a base station and based at least in part on the session start or stop indication, information indicating at least one of the service type associated with the QoE configuration, the RRC level identifier associated with the QoE configuration, the QoE reference associated with the QoE configuration, or the QMC associated with the QoE configuration.

2. The UE of claim 1, wherein the session start or stop indication includes the RRC level identifier, based at least in part on the RRC level identifier being received at the application layer.

3. The UE of claim 1, wherein the one or more processors are further configured to derive the RRC level identifier at the RRC layer based at least in part on the session start or stop indication from the application layer including the QoE reference and not including the RRC level identifier.

4. The UE of claim 1, wherein the one or more processors are further configured to:

receive an RRC configuration at the RRC layer, the RRC configuration including the QoE configuration and at least one of the service type associated with the QoE configuration, the RRC level identifier associated with the QoE configuration, or the QoE reference associated with the QoE configuration, and forward at least the QoE configuration and the service type from the RRC layer to the application layer.

5. The UE of claim 4, wherein the one or more processors are further configured to store, at the RRC layer, information associated with a mapping between the RRC level identifier and the QoE reference based at least in part on the RRC configuration including the QoE reference.

6. A first base station for wireless communication, comprising:

a memory; and one or more processors, coupled to the memory, configured to:

receive, from a user equipment (UE), information indicating at least one of a service type associated with a quality of experience (QoE) configuration, a radio resource control (RRC) level identifier associated with the QoE configuration, a QoE reference associated with the QoE configuration, or a QoE measurement collection (QMC) associated with the QoE configuration, wherein the information indicating the at least one of the service type, the RRC level identifier, the QoE reference, or the QMC indicates there is an ongoing QoE session for the QoE configuration at the UE;

store an indication of the QoE configuration based at least in part on receiving the information indicating the at least one of the service type, the RRC level identifier, the QoE reference, or the QMC; and provide the indication of the QoE configuration to a second base station during a triggering event associated with the UE.

7. The first base station of claim 6, wherein the triggering event is a handover of the UE from the first base station to the second base station or a context retrieval associated with operation of the UE in an inactive state.

8. The first base station of claim 6, wherein the one or more processors are further configured to provide an RRC configuration to the UE, the RRC configuration including the QoE configuration and at least one of the service type associated with the QoE configuration, the RRC level identifier associated with the QoE configuration, or a QoE reference associated with the QoE configuration.

9. The first base station of claim 6, wherein the one or more processors are further configured to receive the QoE configuration from a QoE server.

10. A method of wireless communication performed by a user equipment (UE), comprising:

initiating a quality of experience (QoE) session for a QoE configuration, the QoE session being initiated at an application layer of the UE;

providing a session start or stop indication based at least in part on initiating the QoE session, the session start or stop indication being provided from the application layer to a radio resource control (RRC) layer of the UE, wherein the session start or stop indication includes at least one of a service type associated with the QoE configuration, an RRC level identifier associated with the QoE configuration, a QoE reference associated with the QoE configuration, or a QoE measurement collection (QMC) associated with the QoE configuration; and providing, to a base station and based at least in part on the session start or stop indication, information indicating at least one of the service type associated with the QoE configuration, the RRC level identifier associated with the QoE configuration, the QoE reference associated with the QoE configuration, or the QMC associated with the QoE configuration.

11. The method of claim 10, wherein the session start or stop indication includes the RRC level identifier, based at least in part on the RRC level identifier being received at the application layer.

12. The method of claim 10, further comprising deriving the RRC level identifier at the RRC layer based at least in part on the session start or stop indication from the application layer including the QoE reference and not including the RRC level identifier.

13. The method of claim 10, further comprising:

receiving an RRC configuration at the RRC layer, the RRC configuration including the QoE configuration and at least one of the service type associated with the QoE configuration, the RRC level identifier associated with the QoE configuration, or the QoE reference associated with the QoE configuration, and forwarding at least the QoE configuration and the service type from the RRC layer to the application layer.

14. The method of claim 13, further comprising storing, at the RRC layer, information associated with a mapping between the RRC level identifier and the QoE reference based at least in part on the RRC configuration including the QoE reference.

15. A method of wireless communication performed by a first base station, comprising:

receiving, from a user equipment (UE), information indicating at least one of a service type associated with a quality of experience (QoE) configuration, a radio resource control (RRC) level identifier associated with the QoE configuration, a QoE reference associated with the QoE configuration, or a QoE measurement collection (QMC) associated with the QoE configuration, wherein the information indicating the at least one of the service type, the RRC level identifier, the QoE reference, or the QMC indicates there is an ongoing QoE session for the QoE configuration at the UE;

storing an indication of the QoE configuration based at least in part on receiving the information indicating the at least one of the service type, the RRC level identifier, the QoE reference, or the QMC; and providing the indication of the QoE configuration to a second base station during a triggering event associated with the UE.

16. The method of claim 15, wherein the triggering event is a handover of the UE from the first base station to the second base station or a context retrieval associated with operation of the UE in an inactive state.

17. The method of claim 15, further comprising providing an RRC configuration to the UE, the RRC configuration including the QoE configuration and at least one of the service type associated with the QoE configuration, the RRC level identifier associated with the QoE configuration, or a QoE reference associated with the QoE configuration.

18. The method of claim 15, further comprising receiving the QoE configuration from a QoE server.

* * * * *